(12) United States Patent
Ahn et al.

(10) Patent No.: US 12,211,489 B2
(45) Date of Patent: Jan. 28, 2025

(54) ELECTRONIC APPARATUS, SYSTEM AND METHOD FOR USING SPEECH RECOGNITION SERVICE

(71) Applicant: Samsung Electronics Co., Ltd., Suwon-si (KR)

(72) Inventors: Jin Hyeong Ahn, Suwon-si (KR); Hyoung-Jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 17/276,309

(22) PCT Filed: Sep. 20, 2019

(86) PCT No.: PCT/KR2019/012288
§ 371 (c)(1),
(2) Date: Mar. 15, 2021

(87) PCT Pub. No.: WO2020/060325
PCT Pub. Date: Mar. 26, 2020

(65) Prior Publication Data
US 2022/0036882 A1    Feb. 3, 2022

(30) Foreign Application Priority Data
Sep. 21, 2018   (KR) .................. 10-2018-0114197

(51) Int. Cl.
*G10L 17/22*     (2013.01)
*G06F 9/54*      (2006.01)
(Continued)

(52) U.S. Cl.
CPC .............. *G10L 15/08* (2013.01); *G06F 9/547* (2013.01); *H04L 67/02* (2013.01); *G10L 2015/088* (2013.01)

(58) Field of Classification Search
CPC .............. G10L 15/22; G10L 2015/088; G10L 2015/223; G10L 15/26; G10L 15/30;
(Continued)

(56) References Cited

U.S. PATENT DOCUMENTS 8,793,265 B2 *   7/2014   Song .................... G06F 16/951
                                                    707/758
10,311,877 B2    6/2019   Lee et al.
(Continued)

FOREIGN PATENT DOCUMENTS

KR   10-2008-0033070 A   4/2008
KR   10-2016-0082151 A   7/2016
(Continued)

OTHER PUBLICATIONS

Korean Office Action dated Jul. 23, 2024, issued in Korean Patent Application No. 10-2018-0114197.

*Primary Examiner* — Olujimi A Adesanya
(74) *Attorney, Agent, or Firm* — Jefferson IP Law, LLP

(57) ABSTRACT

According to an embodiment, an electronic apparatus includes a plurality of service engines corresponding to a plurality of speech recognition services, respectively; a communication module connected via wireless communication to a plurality of service servers for providing the plurality of speech recognition services, respectively; a mike configured to receive speech of a user; and a service controller configured to store at least one wakeup word corresponding to each of the plurality of speech recognition services in advance, determine a speech recognition service corresponding to a wakeup word received by the mike from among the plurality of speech recognition services based on the plurality of wakeup words stored in advance, send a user command received by the mike to a service engine corre- (Continued)

sponding to the determined speech recognition service among the plurality of service engines.

19 Claims, 22 Drawing Sheets

(51) Int. Cl.
*G10L 15/08* (2006.01)
*G10L 15/22* (2006.01)
*H04L 67/02* (2022.01)

(58) Field of Classification Search
CPC ....... G10L 25/78; G10L 15/063; G10L 17/00; G10L 15/00
See application file for complete search history.

(56) References Cited

U.S. PATENT DOCUMENTS

| | | | |
|---|---|---|---|
| 11,636,861 B2 | 4/2023 | Kim et al. | |
| 2011/0225180 A1* | 9/2011 | Liao | G06F 16/3322 707/769 |
| 2013/0019202 A1* | 1/2013 | Regan | G06F 16/9535 707/706 |
| 2015/0142447 A1* | 5/2015 | Kennewick | G10L 15/24 704/275 |
| 2018/0068659 A1 | 3/2018 | Ikeno et al. | |
| 2018/0096283 A1* | 4/2018 | Wang | G06Q 10/063112 |
| 2018/0108343 A1* | 4/2018 | Stevans | G10L 13/00 |
| 2018/0114531 A1* | 4/2018 | Kumar | G10L 15/30 |
| 2018/0204060 A1 | 7/2018 | Merchant et al. | |
| 2018/0293484 A1* | 10/2018 | Wang | G06F 16/632 |
| 2018/0301147 A1* | 10/2018 | Kim | G10L 15/02 |
| 2019/0013019 A1* | 1/2019 | Lawrence | G10L 15/30 |
| 2019/0066672 A1* | 2/2019 | Wood | H04L 67/1014 |
| 2019/0066687 A1* | 2/2019 | Wood | H04R 1/326 |
| 2019/0102145 A1* | 4/2019 | Wilberding | H04N 21/43615 |
| 2019/0179611 A1* | 6/2019 | Wojogbe | H04R 3/04 |
| 2019/0325068 A1* | 10/2019 | Lai | G06F 16/951 |
| 2020/0183815 A1* | 6/2020 | Mont-Reynaud | G06F 11/3688 |
| 2021/0183397 A1* | 6/2021 | Liu | G06F 3/167 |

FOREIGN PATENT DOCUMENTS

| | | |
|---|---|---|
| KR | 10-2017-0093629 A | 8/2017 |
| KR | 10-1777392 B1 | 9/2017 |
| KR | 10-1786533 B1 | 10/2017 |
| KR | 10-2018-0075050 A | 7/2018 |
| KR | 10-2018-0083587 A | 7/2018 |

\* cited by examiner

FIG. 11

| SERVICE DOMAIN | TEXT |
|---|---|
| WEATHER | HOW IS THE WEATHER? / GIVE ME WEATHER INFORMATION / IS THE WEATHER GOOD? / IS IT COLD? / WHAT DEGREE IS IT? |
| RECIPE | GIVE ME THE RECIPE / GIVE ME HOW TO COOK / HOW TO COOK? |
| LIGHT CONTROL | TURN ON THE LIGHT / TURN OFF THE LIGHT / LIGHT ON / LIGHT OFF |
| MESSAGE | SEND THE MESSAGE / TRANSMIT THE MESSAGE / SEND THE TEXT / TRANSMIT THE TEXT |
| ⋮ | ⋮ |

FIG. 12

| SERVICE DOMAIN | KEYWORD |
|---|---|
| WEATHER | TIME + WEATHER |
| RECIPE | DISH NAME + RECIPE |
| LIGHT CONTROL | LIGHT + CONTROL |
| MESSAGE | MESSAGE + TRANSMIT |
| ⋮ | ⋮ |

FIG. 13

| SPEECH RECOGNITION SERVICE TYPE | SERVICE DOMAIN |
|---|---|
| FIRST SERVICE | WEATHER, TIME, ALARM, SCHEDULE ... |
| SECOND SERVICE | CONTACTS, MESSAGE, NAVIGATION, TAXI CALL ... |
| THIRD SERVICE | RECIPE, MUSIC, BROADCASTING, MOVIE, HOME APPLIANCE CONTROL, LIGHT CONTROL ... |

ELECTRONIC APPARATUS, SYSTEM AND METHOD FOR USING SPEECH RECOGNITION SERVICE

TECHNICAL FIELD

The disclosure relates to an electronic apparatus, system, and method for using a speech recognition service, allowing a plurality of speech recognition services of different types to be used in a single device.

BACKGROUND ART

To increase user convenience, speech recognition services are being developed and widespread these days, which provide services corresponding to intentions of a user by recognizing speech of the user when the user utters a command that he/she wants, instead of receiving a command from the user through manual operation with an input device.

Depending on the businesses for providing speech recognition services or functions supported by the speech recognition services, there may be various types of speech recognition services. Every speech recognition service type may have a differently specified function, and even when the same function is provided, every user may have a different preference for the speech recognition service.

Hence, providing different types of speech recognition services in a single electronic device may widen the range of services to be provided for the user, and is expected to provide a suitable service to the user's intention or preference.

DESCRIPTION OF EMBODIMENTS

Technical Problem

The disclosure provides an electronic apparatus, system and method for using a speech recognition service, capable of widening the range of services available to the user and providing a suitable service to the user's intention or preference by supporting different types of a plurality of speech recognition services in a single device.

Solution to Problem

According to an embodiment, an electronic apparatus includes a plurality of service engines corresponding to a plurality of speech recognition services, respectively; a communication module connected via wireless communication to a plurality of service servers for providing the plurality of speech recognition services, respectively; a mike configured to receive speech of a user; and a service controller configured to store at least one wakeup word corresponding to each of the plurality of speech recognition services in advance, determine a speech recognition service corresponding to a wakeup word received by the mike from among the plurality of speech recognition services based on the plurality of wakeup words stored in advance, send a user command entered to the mike to a service engine corresponding to the determined speech recognition service among the plurality of service engines.

The plurality of service engines may run a plurality of applications, respectively, to use the plurality of speech recognition services.

The service engine corresponding to the determined speech recognition service may transmit the user command to a service server which provides the determined speech recognition service among the plurality of service servers, through the communication module.

The service engine corresponding to the determined speech recognition service may receive a service response corresponding to the user command from the service server which provides the determined speech recognition service among the plurality of service servers, through the communication module.

The service controller may recognize and convert the wakeup word received by the mike into text.

At least one of the plurality of service engines may recognize and convert the wakeup word received by the mike into text.

According to an embodiment, a system includes an electronic apparatus which is able to use a plurality of speech recognition services; and a domain classification server which determines a service domain corresponding to a user command entered to the electronic apparatus, wherein the electronic apparatus includes a plurality of service engines corresponding to the plurality of speech recognition services, respectively: a communication module connected via wireless communication to a plurality of service servers for providing the plurality of speech recognition services, respectively, and the domain classification server; a mike for receiving the user command and a service controller configured to transmit the user command entered to the mike to the domain classification server through the communication module, determine a speech recognition service corresponding to a service domain determined by the domain classification server, and send the user command to a service engine corresponding to the determined speech recognition service from among the plurality of service engines.

The plurality of service engines may run a plurality of applications, respectively, to use the plurality of speech recognition services.

The domain classification server may perform text matching or keyword matching to the user command to determine a service domain corresponding to the user command The domain classification server may store at least one text corresponding to each of the plurality of service domains in advance and determine whether the at least one text stored in advance matches the user command, to perform the text matching.

The domain classification server may determine whether the at least one text stored in advance corresponds to the user command, to perform the text matching.

The domain classification server may determine whether the user command includes the at least one text stored in advance, to perform the text matching.

The domain classification server may store at least one keyword corresponding to each of the plurality of service domains in advance and determine whether the user command includes the at least one keyword stored in advance, to perform the keyword matching.

The domain classification server may set priorities between the plurality of service domains, and determine a service domain corresponding to the user command based on the priorities when the user command includes keywords corresponding to two or more service domains.

The domain classification server may update a database used for the text matching or the keyword matching based on a user feedback about the determined service domain when the user feedback is transmitted from the electronic apparatus.

The service controller may send the user command to the plurality of service engines when the domain classification server fails to determine a service domain corresponding to the user command, and the plurality of service engines may transmit the user command to the plurality of service servers through the communication module.

The electronic apparatus may further include a main controller for controlling the electronic apparatus to output a service response corresponding to the user command when the service response is transmitted from at least one of the plurality of service servers.

The domain classification server may update a database used to determine the service domain based on the user feedback about the output service response, when the user feedback is transmitted from the electronic apparatus.

According to an embodiment, a method for using a speech recognition service, allowing a plurality of speech recognition services to be used in a single electronic apparatus, includes receiving a wakeup word uttered by a user through a mike equipped in the single electronic apparatus; determining a speech recognition service corresponding to the received wakeup word, based on a plurality of wakeup words stored to correspond to the plurality of speech recognition services, respectively; receiving a user command uttered by the user through the mike; sending the received user command to a service engine corresponding to the determined speech recognition service, among a plurality of service engines corresponding to the plurality of speech recognition services, respectively; and transmitting, by the service engine, the received user command to a service server which provides the determined speech recognition service.

The method may further include receiving a service response corresponding to the received user command from the service server which provides the speech recognition service corresponding to the received wakeup word; and outputting the received service response.

According to another embodiment, a method for using a speech recognition service, allowing a single electronic apparatus to use a plurality of speech recognition services, includes receiving a user command uttered by a user through a mike equipped in the single electronic apparatus; determining a service domain corresponding to the received user command; determining a speech recognition service corresponding to the service domain from among the plurality of speech recognition services; sending the received user command to a service engine corresponding to the determined speech recognition service, among a plurality of service engines corresponding to the plurality of speech recognition services, respectively; and transmitting, by the service engine, the received user command to a service server which provides the determined speech recognition service.

Determining of the service domain corresponding to the received user command may include performing text matching or keyword matching to the received user command Determining of the service domain corresponding to the received user command may include storing at least one text corresponding to each of the plurality of service domains in advance and determining whether the at least one text stored in advance matches the received user command, to perform the text matching.

Determining of the service domain corresponding to the received user command may include storing at least one keyword corresponding to each of the plurality of service domains in advance and determining whether the received user command includes the at least one keyword stored in advance, to perform the keyword matching.

Determining of the service domain corresponding to the received user command may include setting priorities between the plurality of service domains; and determining a service domain corresponding to the received user command based on the priorities when the user command includes keywords corresponding to two or more service domains.

The method may further include updating a database used for the text matching or the keyword matching based on a user feedback about the determined service domain when the user feedback is received.

The method may further include sending the received user command to the plurality of service engines when the determining of the service domain corresponding to the received user command has failed; transmitting, by the plurality of service engines, the received user command to a plurality of service servers which provide the plurality of speech recognition services, respectively.

The method may further include outputting a service response corresponding to the received user command when the service response is transmitted from at least one of the plurality of service servers.

The method may further include receiving a user feedback about the output service response; and updating a database used to determine the service domain, based on the user feedback.

Determining of the service domain corresponding to the received user command may be performed by a domain classification server.

Advantageous Effects of Disclosure

According to an embodiment of an electronic apparatus, system and method for using a speech recognition service, the range of services to be provided for the user may be widened and a suitable service to the user's intention or preference may be provided by supporting a plurality of speech recognition services of different types in a single device.

BRIEF DESCRIPTION OF DRAWINGS

FIG. 11 illustrates a table representing examples of text for each service domain stored in a domain classification server.

FIG. 12 illustrates a table representing an example of keywords for each service domain stored in a domain classification server.

FIG. 13 illustrates a table in which each speech recognition service matches a corresponding service domain.

MODE OF DISCLOSURE

Figure 1:
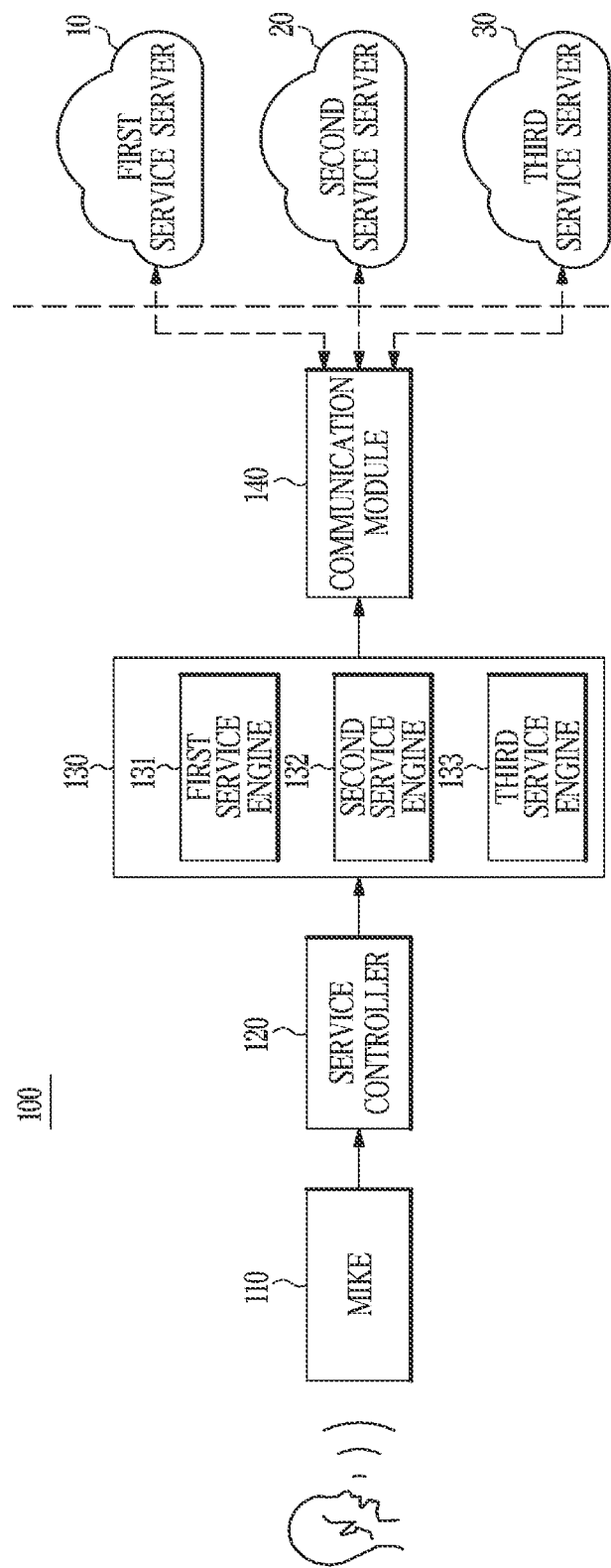
FIG. 1 is a control block diagram of an electronic apparatus, according to an embodiment.

Like numerals refer to like elements throughout the specification. Not all elements of embodiments of the disclosure will be described, and description of what are commonly known in the art or what overlap each other in the embodiments will be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when a component is mentioned to send or transmit a signal to another component, it does not exclude a possibility of an intermediate component that exists between the two components, through which to send or transmit the signal, unless otherwise mentioned.

It is to be understood that the singular forms "a," "an," and "the" include plural references unless the context clearly dictates otherwise.

Reference numerals used for method steps are just used to identify the respective steps, but not to limit an order of the steps. Thus, unless the context clearly dictates otherwise, the written order may be practiced otherwise.

Embodiments of an electronic apparatus, system, and method for using a speech recognition service will now be described in detail with reference to accompanying drawings.

In an aspect, an electronic apparatus is a device that is able to receive speech through a mike and exchange data with an external device through communication, and may refer to a home appliance such as e.g., a refrigerator, a television (TV), an air conditioner, a washer, an air purifier, a humidifier, an oven, a microwave, a robot cleaner, an audio system, a speaker, a computer, etc., or a mobile device such as a smart phone, a tablet personal computer (PC), a personal digital assistant (PDA), etc., and components of the electronic apparatus, as will be described below, may be equipped in a vehicle.

Furthermore, the electronic apparatus in an aspect may perform speech recognition or provide a service through speech recognition, and in some embodiments, may perform machine learning or provide a result of the machine learning. Accordingly, the electronic apparatus, such as a refrigerator, a TV, an air conditioner, a speaker, etc., may also be referred to as an artificial intelligence (AI) refrigerator, an AI TV, an AI air conditioner, an AI speaker, etc.

There are no limitations on types, implementation methods, or names of the electronic apparatus in an aspect, as long as the electronic apparatus performs operations as will be described later.

FIG. 1 is a control block diagram of an electronic apparatus, according to an embodiment.

Referring to FIG. 1, an electronic apparatus 100 according to an embodiment includes a mike 110 for receiving speech uttered by the user, a service controller 120 for recognizing the received speech of the user and determining a speech recognition service corresponding to the utterance of the user from among a plurality of speech recognition services based on a result of the recognizing, a communication module 140 for performing communication and exchanging data with an external device, and a service engine module 130 connected to a service server for providing a speech recognition service corresponding to the utterance of the user through the communication module 140.

The mike 110 may include a microphone that receives and converts a sound to an electric signal. The mike 110 may be provided in singular in the electronic apparatus 100, or may be provided in plural to increase speech recognition performance.

The mike 110 may be mounted on the exterior of the electronic apparatus 100, or may be physically separated from the electronic apparatus 100 and positioned near where the user is. For example, the mike 110 may be implemented with a movable standing mike, a wearable mike such as a headset to be worn by the user, or the like. There are no limitations on positions or implementation types of the mike 110 as long as the mike 110 is able to receive speech of the user.

The speech uttered by the user is converted into an electric signal through the mike 110 and entered to the service controller 120. Speech converted into an electric signal will be hereinafter called a speech signal.

At least one wakeup word corresponding to each speech recognition service may be determined. In this embodiment, the user may utter a wakeup word corresponding to a desired speech recognition service to select the corresponding one of a plurality of speech recognition services. In this case, the user only needs to utter a wakeup word for a speech recognition service that the user wants to use, without a need to utter an extra wakeup word to activate a speech recognition mode or a wakeup word designated for a default speech recognition service of the electronic apparatus 100.

The wakeup word may be used as a trigger signal to activate a speech recognition mode. Once the wakeup word is uttered, the speech recognition mode is activated, and an utterance of the user received after the wakeup word may be dealt with as a commands to request a particular function and subject to speech recognition and natural language understanding (NLU). In this case, a time limit after the utterance of the wakeup word may be set, and only when a user utterance is entered into the electronic apparatus 100 within the time limit, it may be recognized as a command for the electronic apparatus 100.

The wakeup word may include one word or two or more words. There are no limitations on the length of the wakeup word as long as the wakeup word is predefined.

The service controller 120 may determine which one of the plurality of speech recognition services available to the electronic apparatus 100 is to be used, and perform an operation to send the user command to the determined speech recognition service.

Specifically, the service controller 120 may determine a speech recognition service corresponding to the wakeup word uttered by the user and activate the determined speech recognition service. In this case, activating the speech recognition service may refer to transmitting user speech uttered after the wakeup word to a service server for providing a corresponding speech recognition service or putting the user speech into a state that may be transmitted to the service server.

The service controller 120 may be implemented with at least one memory for storing a program for carrying out the aforementioned and following operations and associated data, and at least one processor for executing the program.

When the service controller 120 is implemented by two or more memories or two or more processors, these memories and processors may be integrated in a single chip or may be physically separated.

In the following embodiments, for convenience of explanation, three types of speech recognition services available to the electronic apparatus 100 will be taken as an example, and the speech recognition services are referred to as and divided into first, second, and third services, respectively.

The first service may be provided by a first service server 10, the second service may be provided by a second service server 20, and the third service may be provided by a third service server 30.

The speech recognition service may refer to a service that recognizes a user speech and grasps the user's intention by performing NLU, and provides a function that matches the user's intention. Types of speech recognition service may be classified by providing entities or by functions provided by the speech recognition services.

In order for the electronic apparatus 100 to use a speech recognition service, an application may be installed to perform various processes required to provide the speech recognition service. The application may be installed in a stage of manufacturing or selling the electronic apparatus 100, or after purchasing the electronic apparatus 100, the user may additionally download and install the application from an external server or a storage medium.

Execution of the application may be performed by a service engine module 130. In the embodiment, the service engine module 130 may include a first service engine 131 for performing a process to provide the first service, a second service engine 132 for performing a process to provide the second service, and a third service engine 133 for performing a process to provide the third service.

Each service engine may be connected to a corresponding service server through the communication module 140 to deliver a user command received through the electronic apparatus 100 to the service server and perform various processes to receive a service response delivered from the service server. In the following embodiment, it is assumed that the service engine transmits or receives data to or from the service server through the communication module 140.

A service response delivered from the service server may refer to a response to provide a service or a function corresponding to a user command The service or the function corresponding to the user command may refer to a service or a function indicated or implied by the user command The service response may include data for providing information, a content file such as an image file, a video file, or an audio file, or an interactive response to continue interaction with the user, depending on a function corresponding to the user command The service engine module 130 may be implemented with at least one memory for storing a program to perform an operation of each service engine and associated data, and at least one processor for executing the program.

Every service engine may use a memory and a processor separately, or a plurality of service engines may share a memory and a processor. Furthermore, the service engine module 130 may share a memory and a processor with the service controller 120.

The communication module 140 may include at least one communication module for transmitting or receiving data according to a predefined communication protocol. For example, it may include at least one of various wireless communication modules that may access the Internet in a wireless communication scheme, such as wireless fidelity (Wi-Fi), wireless broadband (Wibro), global system for mobile communication (GSM), code division multiple access (CDMA), wideband code division multiple access (WCDMA), universal mobile telecommunications system (UMTS), time division multiple access (TDMA), long term evolution (LTE), fourth generation (4G) mobile communication, fifth (5G) generation mobile communication, etc.

The communication module 140 may communicate and exchange data with the first service server 10, the second service server 20, or the third service server in the aforementioned communication scheme.

The communication module 140 may be controlled by the service controller 120 or the service engine module 130 to exchange data with an external server including the first service server 10, the second service server 20, or the third service server 30. Herein, controlling, by the service controller 120 or the service engine module 130, the communication module 140 may include sending, by the service controller 120 or the service engine module 130, data to be transmitted to the external server to the communication module 140.

The communication module 140 may transmit a user command delivered from the first service engine 131 to the first service server 10, transmit a user command delivered from the second service engine 132 to the second service server 20, and transmit a user command delivered from the third service engine 133 to the third service server 30.

Furthermore, the communication module 140 may receive a response transmitted from the first service server 10 and deliver the response to the first service engine 131, receive a response transmitted from the second service server 20 and deliver the response to the second service engine 132, and receive a response transmitted from the third service server 30 and deliver the response to the third service engine 133.

Figure 2:
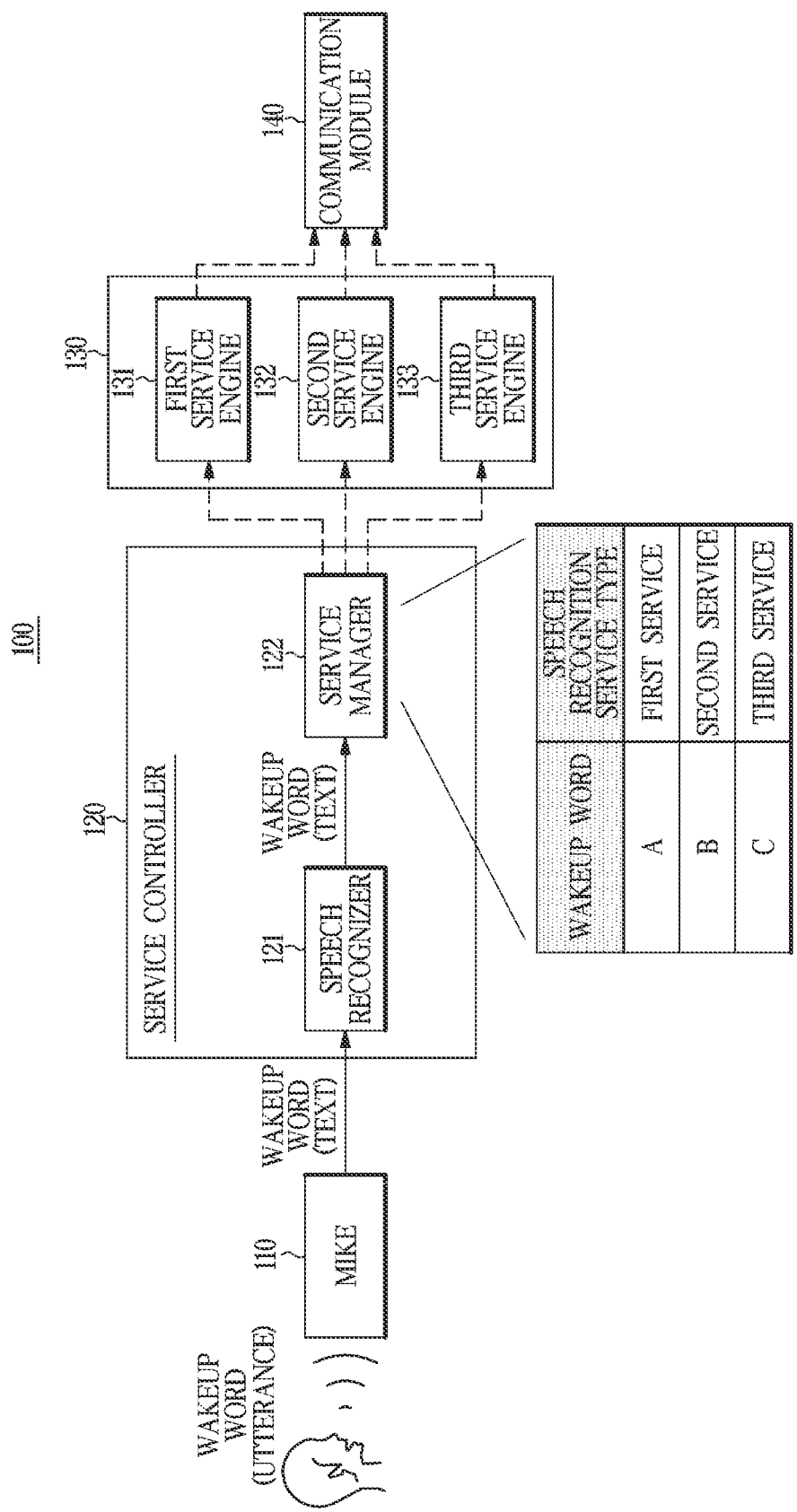
FIGS. 2 to 4 are detailed control block diagrams of an electronic device, according to an embodiment.
Figure 3:
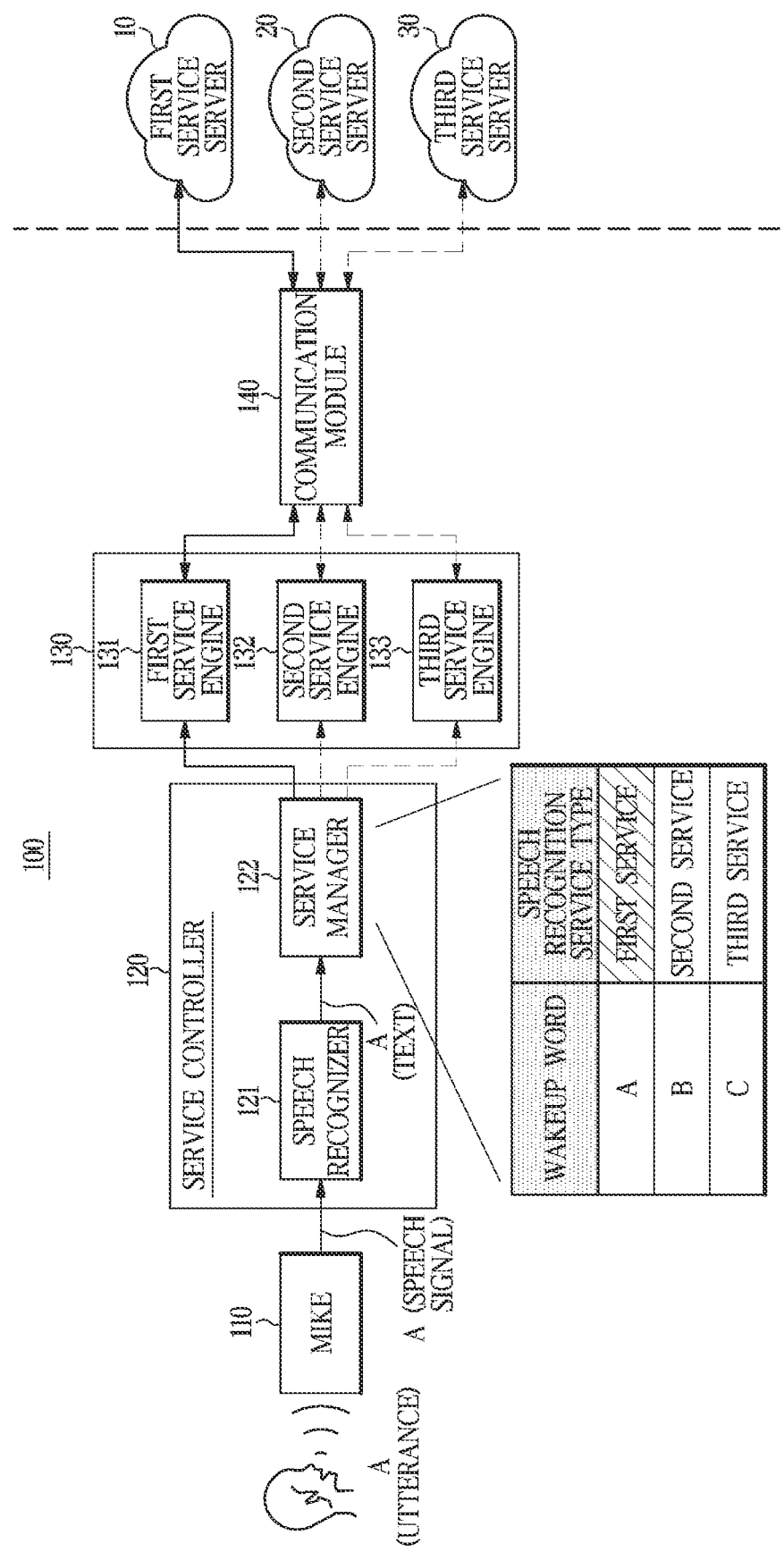
Figure 4:
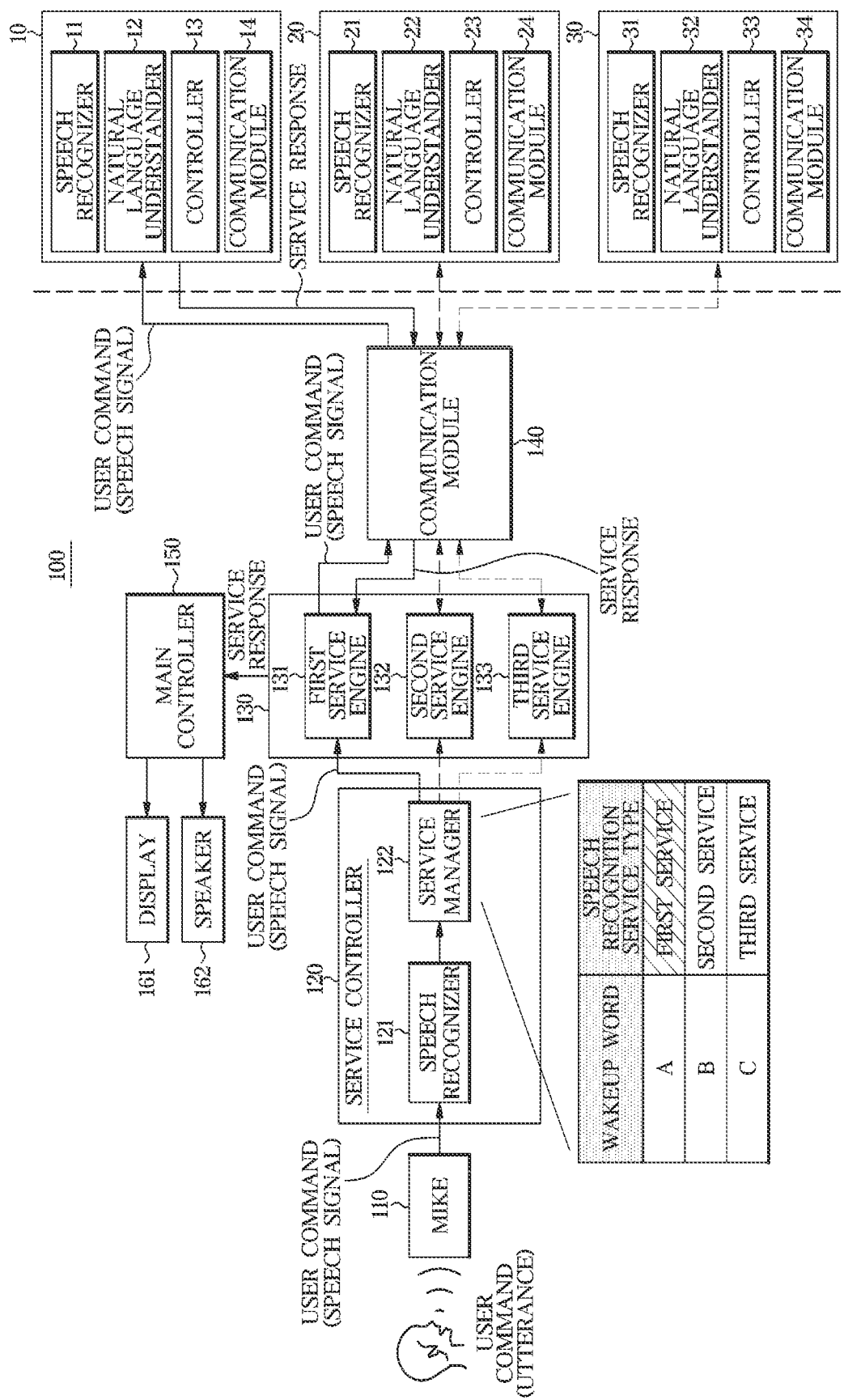

FIGS. 2 to 4 are detailed control block diagrams of an electronic device, according to an embodiment.

Referring to FIG. 2, when the user utters a wakeup word corresponding to a speech recognition service that the user wants to use, the mike 110 may receive the uttered wakeup word, convert it to a speech signal, which is an electric signal, and deliver the speech signal to the service controller 120.

The service controller 120 may include a speech recognizer 121 for recognizing a wakeup word, and a service manager 122 for determining a service corresponding to the recognized wakeup word.

The speech recognizer 121 may include a speech recognition engine for recognizing speech and output it as an utterance in the form of text. For example, the speech recognizer 121 may detect an actual speech section included in the entered speech through end point detection (EPD), and extract a feature vector of the entered speech in the detected section. A result of the recognizing may be obtained by comparing the extracted feature vector with a trained reference pattern, and for this, an acoustic model database (DB) or a language model DB may be stored and used. For example, an acoustic model with a hidden Markov model applied thereto may be used, or an N-best search method that combines the acoustic model and the language model may be used.

Furthermore, the speech recognizer 121 may calculate a confidence value to secure confidence in the recognition result. The confidence value is a measure to indicate how reliable the speech recognition result is. For example, a recognition result, a phoneme or word, may be defined by a relative value to a probability of the speech having been uttered from other phonemes or words. Accordingly, the confidence value may be represented with a value ranging from 0 to 1, or from 0 to 100. When the confidence value exceeds a preset threshold, the recognition result may be output so that an operation corresponding to the recognition result may be performed, and when the confidence value is equal to or less than the threshold, the recognition result may be rejected.

The speech recognizer 121 may be designed to recognize a predetermined wakeup word. Wakeup words recognizable to the speech recognizer 121 may include a wakeup word corresponding to the first service, a wakeup word corresponding to the second service, and a wakeup word corresponding to the third service. Furthermore, it may also recognize an extra wakeup word for activating a speech recognition mode of the electronic apparatus 100.

The speech recognizer 121 may recognize more words, but limiting a recognition range to some predefined wakeup words may reduce the volume of the memory or processor required for speech recognition.

A wakeup word in the form of text corresponding to a recognition result of the speech recognizer 121 may be entered to the service manager 122. A wakeup word table in which each speech recognition service type matches a corresponding wakeup word may be stored in the service manager 122. The service manager 122 may determine what speech recognition service is that the user wants to use by comparing a wakeup word entered from the speech recognizer 121 with the wakeup word table.

For each speech recognition service type, one wakeup word is stored in the example of FIG. 2, but two or more wakeup words may be stored.

According to the example of FIG. 2, a wakeup word corresponding to the first service is called 'A', a wakeup word corresponding to the second service is called 'B', and a wakeup word corresponding to the third service is called 'C'. Each of A, B, and C may include one or more words.

When the user utters A, the service manager 122 determines a speech recognition service desired by the user to be the first service; when the user utters B, the service manager 122 determines a speech recognition service desired by the user to be the second service; when the user utters C, the service manager 122 determines a speech recognition service desired by the user to be the third service.

The service manager 122 may control the service engine module 130 to transmit a command uttered after the wakeup word to a server that provides a service corresponding to the wakeup word. In this case, controlling, by the service manager 122, the service engine module 130 may include sending the user command to the service engine module 130.

Referring to an example of FIG. 3, when the user utters A for wakeup word, the uttered A may be entered to the mike 110, and the mike 110 may convert A to a speech signal and send the speech signal to the speech recognizer 121. The speech recognizer 121 outputs a recognition result for A into text, and the wakeup word A converted into text is entered to the service manager 122.

The service manager 122 searches the stored wakeup word table for a type of the speech recognition service corresponding to the wakeup word A, and determines the first service as a service corresponding to the wakeup word A.

After this, a user command uttered is transmitted to the first service server 10 through the first service engine 131 and the communication module 140, and a service response transmitted from the first service server 10 is sent to the first service engine 131 through the communication module 140.

Referring to an example of FIG. 4, when the user utters a command after the wakeup word, the uttered user command is entered to the mike 110, and the mike 110 may convert the entered user command to a speech signal and deliver the speech signal to the service manager 122.

The service manager 122 may send the user command to the first service engine 131, and the first service engine 131 may transmit the user command to the first service server 10 through the communication module 140.

The first service server 10 determines what request is contained in the transmitted user command by performing speech recognition and NLU on the transmitted user command For example, the first service server 10 may include a speech recognizer 11 for performing speech recognition on the transmitted user command, a natural language understander 12 for understanding a request of the user by performing NLU on the command in the form of text output from the speech recognizer 11, a controller 13 for creating a service response corresponding to the request of the user, and a communication module 14 for transmitting the service response corresponding to the user command to the electronic apparatus 100.

Likewise, the second service server 20 may also include a speech recognizer 21, a natural language understander 22, a controller 23, and a communication module 24, and the third service server 30 may also include a speech recognizer 31, a natural language understander 32, a controller 33, and a communication module 34.

The communication module 14 of the first service server 10 receives a user command from the electronic apparatus 100, and the speech recognizer 11 recognizes and converts the received user command into text. The natural language understander 12 may determine what a request of the user is that corresponds to the user command by performing NLU that includes processes such as morpheme analysis, syntax analysis, object name analysis, speech act analysis, speech intention analysis, etc., on the user command converted into text.

The controller 13 may use information or contents stored in the first service server 10 itself or fetch information or contents required from another server, to create the service response corresponding to the determined request of the user. Hereinafter, the other server that provides information or contents will be called a contents provider.

When the communication module 14 receives information or contents required from the contents provider, the controller 13 may transmit a service response that includes the received information or contents to the electronic apparatus 100 through the communication module 14.

Alternatively, when it is possible that the request of the user is performed in the electronic apparatus 100, the first service server 10 may also send a result of speech recognition and NLU to the electronic apparatus 10 as a service response.

When the communication module 140 of the electronic apparatus 100 receives the service response from the first service server 10, the first service engine 131 may send the received service response to the main controller 150.

The main controller 150 may control general operation of the electronic apparatus 100, so it may provide a service matched with the request of the user by performing suitable control in accordance with the received service response. For example, when a service matched with the request of the user is outputting information or content, the service response may be output visually or audibly through the display 161 or the speaker 162.

In the meantime, the speech recognizer 121 and the service manager 122 in the service controller 120 may be implemented by separate processors, or may share one or more processors. Alternatively, as will be illustrated in FIG. 5, each service engine may be equipped with a speech recognizer that is able to recognize a wakeup word.

Figure 5:
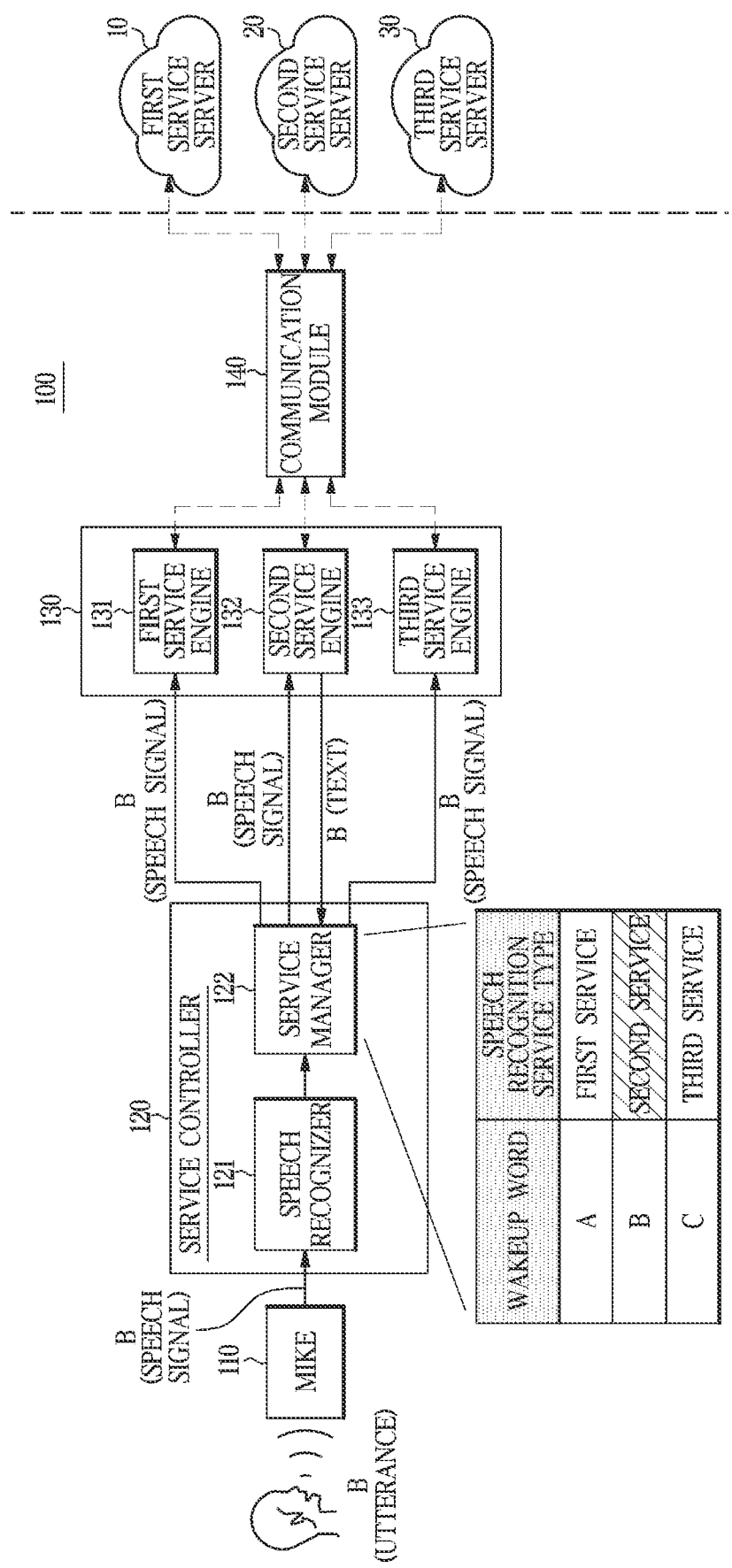
FIG. 5 is a control block diagram of an electronic apparatus, in which each service engine is capable of performing a speech recognition function, according to an embodiment.

FIG. 5 is a control block diagram of an electronic apparatus, in which each service engine is capable of performing a speech recognition function, according to an embodiment.

When the first service engine 131, the second service engine 132, and the third service engine 133 have speech recognizers to recognize predetermined wakeup words, as shown in FIG. 5, the service controller 120 may send wakeup word B uttered by the user to all of the first service engine 131, the second service engine 132, and the third service engine 133.

Each service engine 131, 132, and 133 may recognize only a wakeup word corresponding to a speech recognition service it provides, or may also recognize even a wakeup word corresponding to a speech recognition service provided by another service engine.

In the case of recognizing only a wakeup word corresponding to a speech recognition service it provides, as shown in FIG. 5, the first service engine 131 and the third service engine 132 may not output any recognition results but the second service engine 132 that provides the speech recognition service corresponding to the wakeup word B uttered by the user may recognize the wakeup word B and send the result to the service controller 120.

In the case of recognizing even a wakeup word corresponding to a speech recognition service provided by another service engine, the wakeup word B may be sent to all of the first, second, and third service engines 131, 132, and 133 so that the respective service engines 131, 132, and 133 may all output speech recognition results (B in text), or the wakeup word B may be sent to only a predefined service engine or an arbitrary service engine of the plurality of service engines.

The service manager 122 may determine a speech recognition service corresponding to a wakeup word uttered by the user to be the second service based on the stored wakeup word table, and transmit a command uttered after the wakeup word to the second service server 20 through the second service engine 132 and the communication module 140.

Figure 6:
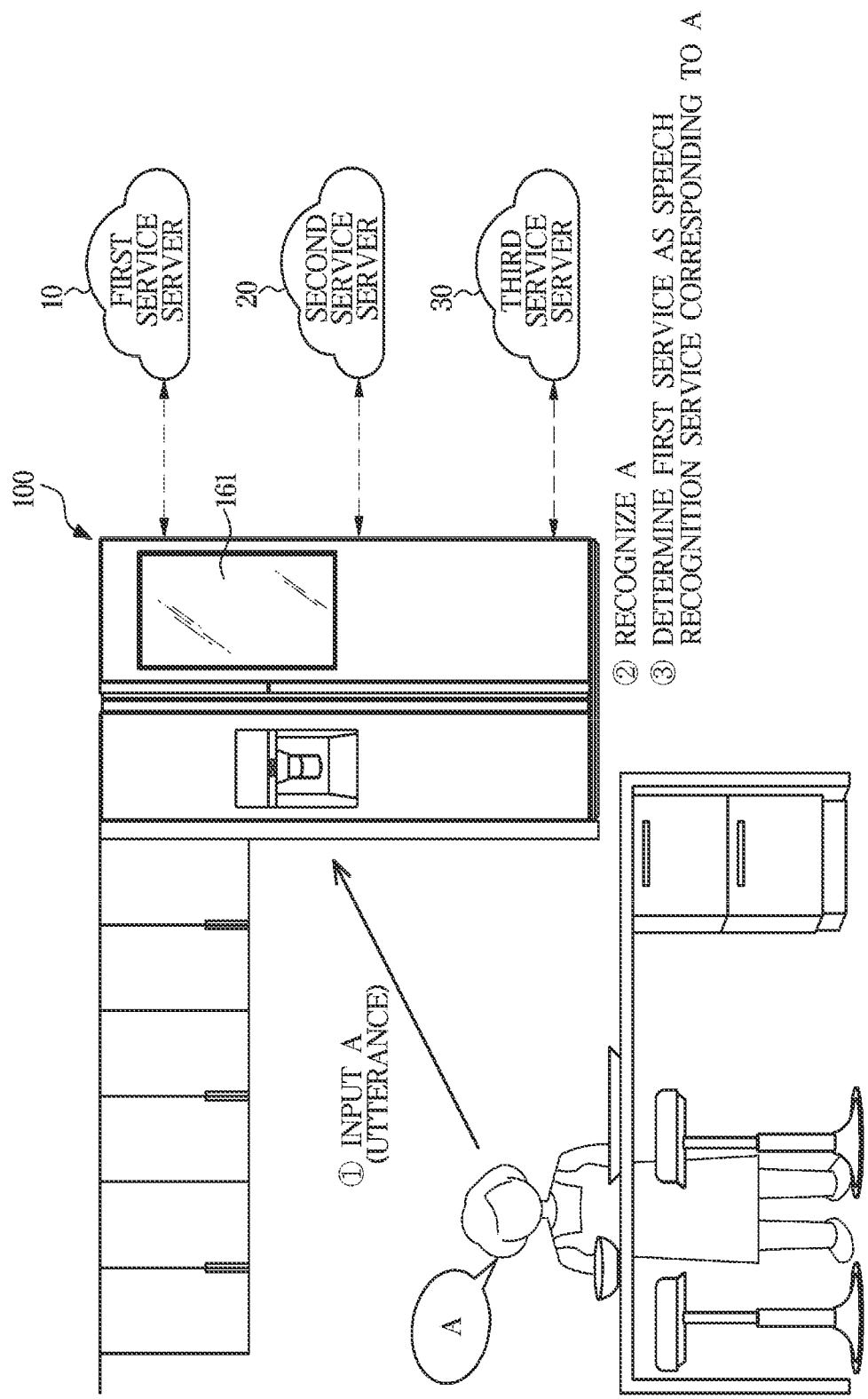
FIGS. 6 to 8 schematically illustrate signal flows when an electronic apparatus according to an embodiment is a refrigerator.
Figure 7:
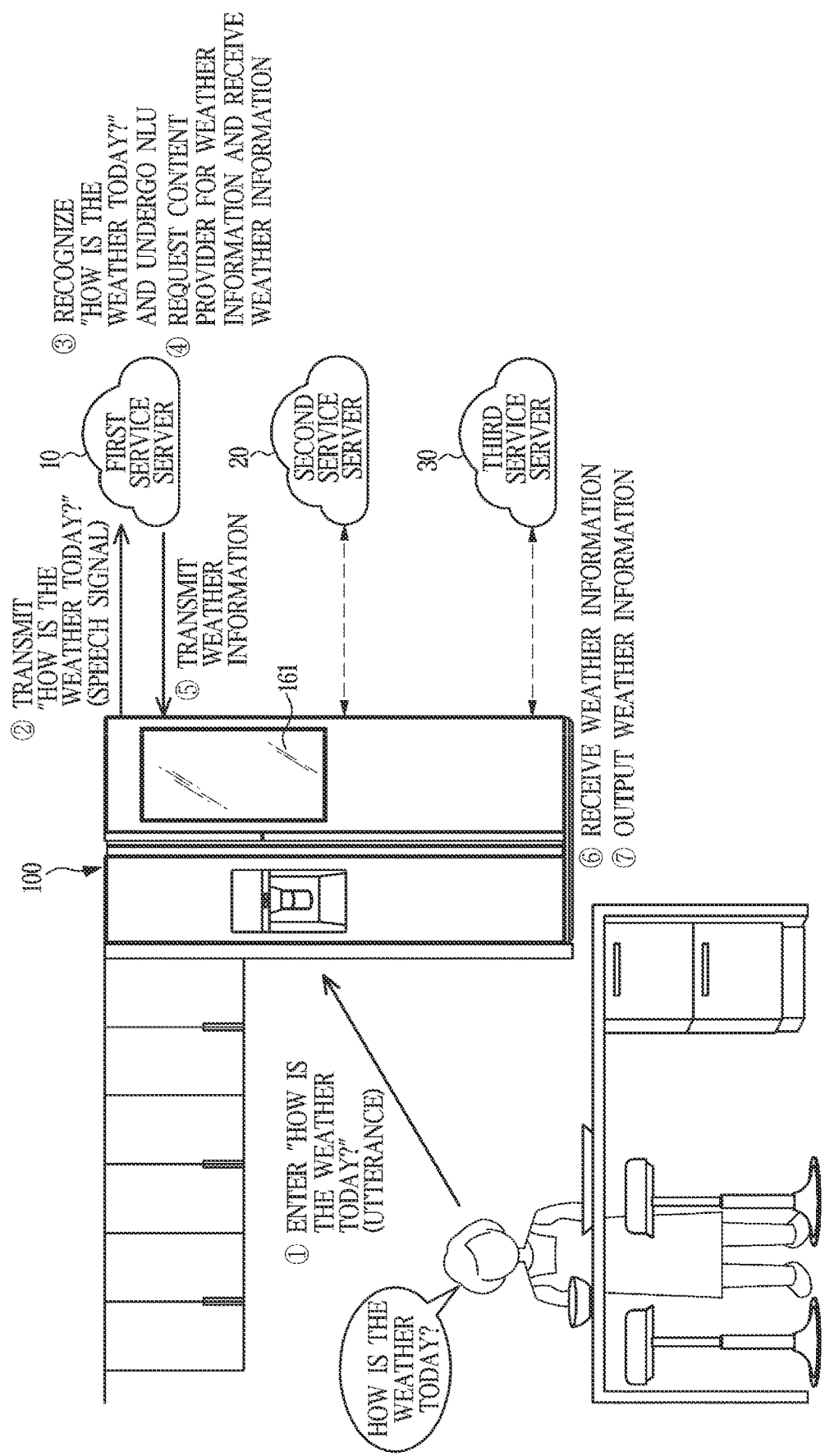
Figure 8:
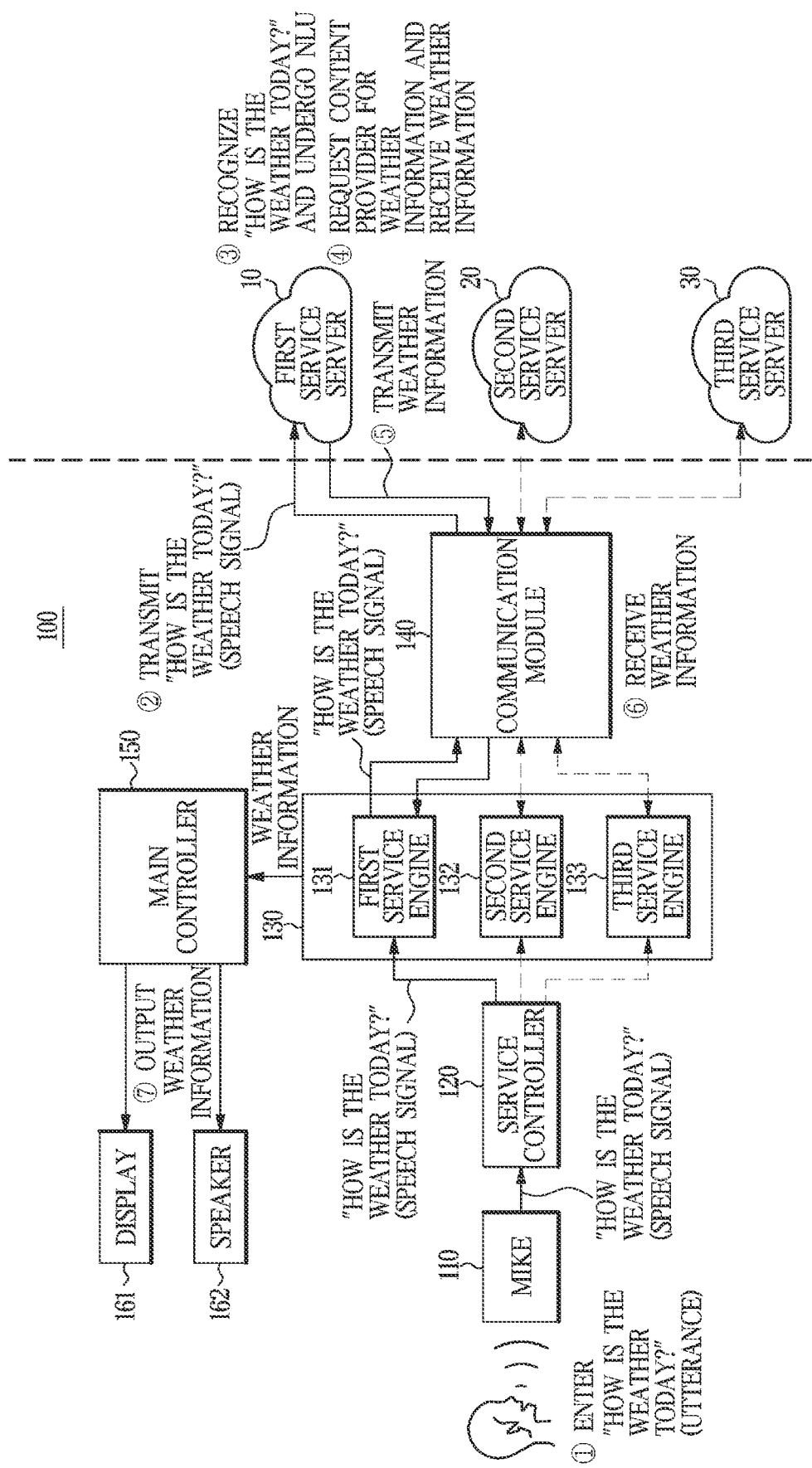

FIGS. 6 to 8 schematically illustrate signal flows when an electronic apparatus according to an embodiment is a refrigerator.

Referring to an example of FIG. 6, when the user utters wakeup word A near a refrigerator to use a speech recognition service, ① the uttered wakeup word A is entered to the mike 110, and the mike 110 converts the entered wakeup word A into a speech signal and sends the speech signal to the service controller 120.

② the service controller 120 recognizes the wakeup word A. Alternatively, as described above in the previous example, the service engine module 130 may perform recognition of wakeup words.

The service controller 120 searches the stored wakeup word table for a speech recognition service corresponding to the recognized wakeup word, and based on a result of the searching, ③ determines that the speech recognition service corresponding to the wakeup word uttered by the user is the first service.

When the service corresponding to the wakeup word uttered by the user is determined to be the first service, the service controller 120 may send a user command uttered after the wakeup word to the first service engine 10.

As shown in examples of FIGS. 7 and 8, when the user utters "how is the weather today" for a user command after the wakeup word, ① the uttered user command "how is the weather today" is entered to the mike 110, and the mike 110 may convert the entered user command "how is the weather today" to a speech signal and deliver the speech signal to the service controller 120.

The service controller 120 may send the user command in the form of a speech signal "how is the weather today" to the first service engine 131, and the first service engine 131 may ② deliver the user command "how is the weather today" to the first service server 10 through the communication module 140.

The first service server 10 may ③ recognize the user command "how is the weather today", and determine what the request included in the user command is by performing NLU on the recognized "how is the weather today".

In this case, the first service server 10 may determine that the request of the user is providing weather information, and ④ request weather information from a contents provider for providing the weather information and receive the weather information.

The first service server 10 ⑤ transmits the weather information received from the contents provider to the refrigerator 100.

When ⑥ the communication module 140 receives the weather information from the first service server 10 and the first service engine 131 sends the received weather information to the main controller 150, ⑦ the main controller 150 may control the display 161 to visually output the weather information and control the speaker 162 to audibly output the weather information.

In the aforementioned embodiment, the user selects one of the plurality of speech recognition services available to the electronic apparatus 100 by uttering a wakeup word corresponding to a speech recognition service that the user wants. An embodiment in which the user may select a speech recognition service in a manner of directly uttering a user command that represents a request the user wants without separately uttering a wakeup word corresponding to the speech recognition service that the user wants will now be described.

Figure 9:
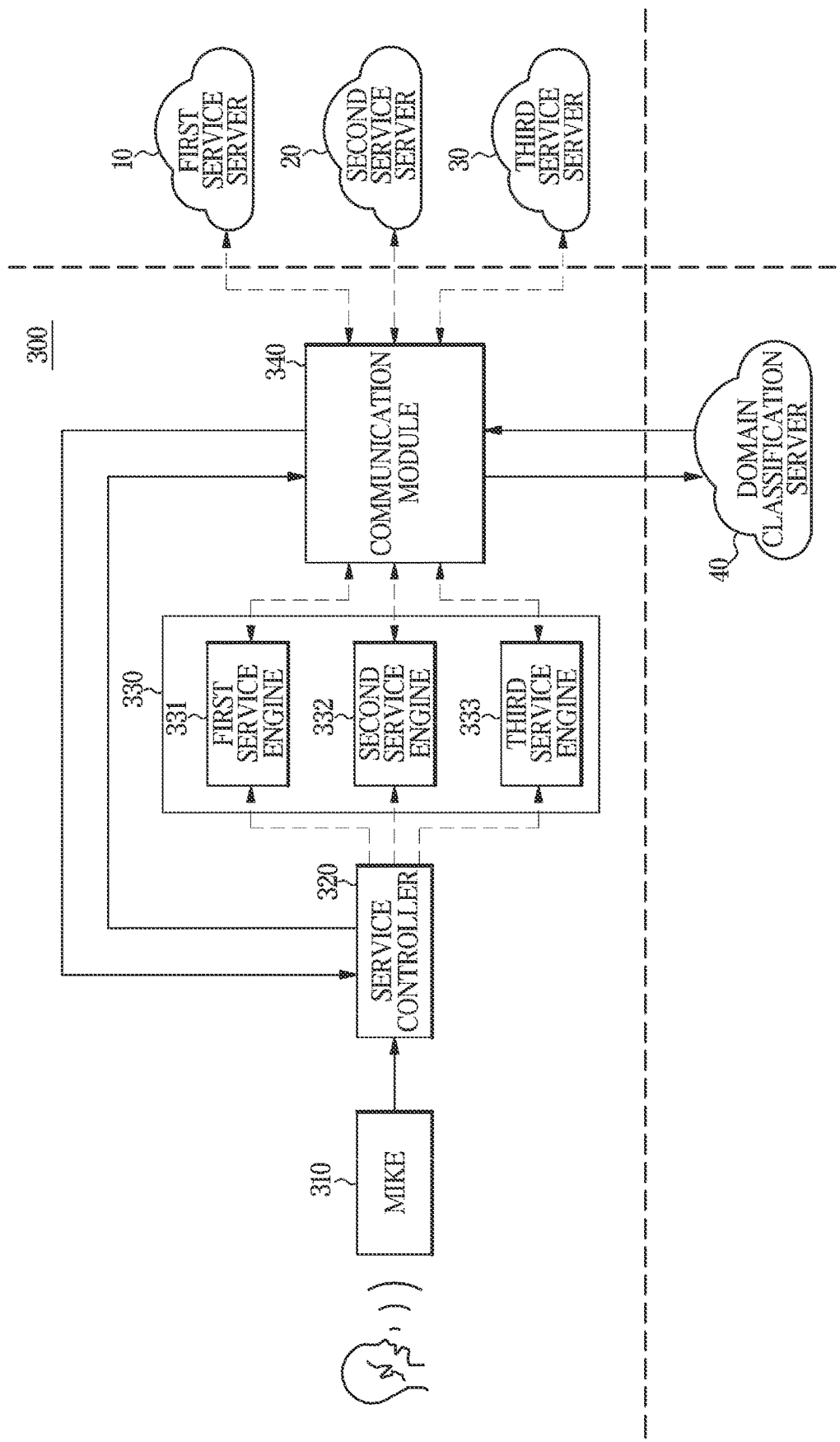
FIG. 9 is a control block diagram of an electronic apparatus, according to another embodiment.

FIG. 9 is a control block diagram of an electronic apparatus, according to another embodiment.

Referring to FIG. 9, an electronic apparatus 300 according to another embodiment includes a mike 310 for receiving speech uttered by the user, a service controller 320 for obtaining a service domain corresponding to a command uttered by the user from the domain classification server 40, a communication module 340 for performing communication and exchanging data with an external device, and a service engine module 330 connected to a service server for providing a speech recognition service through the communication module 340. Herein, the electronic apparatus 300 and the domain classification server 40 may make up a single system. A system according to an embodiment refers to the system including the electronic apparatus 300 and the domain classification server 40.

In this embodiment, for convenience of explanation, three types of speech recognition services available to the electronic apparatus 300 will also be taken as an example, and the speech recognition services are referred to as and divided into first, second, and third services, respectively.

Similar to what are described above, the first service may be provided by the first service server 10, the second service may be provided by the second service server 20, and the third service may be provided by the third service server 30.

The mike 310, the service engine module 330, and the communication module 340 are the same as the mike 110, the service engine module 130, and the communication module 140 in the electronic apparatus 100 in the previous embodiment, so the detailed description will be omitted.

In this embodiment, a speech recognition service that the user wants may be determined even when the user directly utters a command to request a desired function without uttering a wakeup word corresponding to the speech recognition service desired by the user. Even in this case, however, when an extra trigger signal to activate the speech recognition mode is not used, a wakeup word to activate the speech recognition mode of the electronic apparatus 100 may be uttered.

The mike 310 converts the command uttered by the user into a speech signal and sends the speech signal to the service controller 320.

The service controller 320 may transmit the user command in the speech signal form to the domain classification server 40 through the communication module 340. The domain classification server 40 may determine a service domain corresponding to the transmitted user command, and transmit the determined service domain back to the electronic apparatus 300.

The communication module 340 receives the service domain transmitted from the domain classification server 40 and forwards the received service domain to the service controller 320.

The service controller 320 may store a service domain matching table in advance, in which at least one service domain that may be provided in a speech recognition service or at least one service domain specified for the speech recognition service is matched for each speech recognition service type.

Once the service domain determined based on the user command is delivered, the service controller 320 may determine a speech recognition service type corresponding to the received service domain based on the pre-stored service domain matching table, i.e., a speech recognition service type matched with the received service domain and stored.

When the speech recognition service type corresponding to the service domain is determined, the service controller 320 may transmit a user command to a service server for providing the determined speech recognition service, through the service engine corresponding to the determined speech recognition service and the communication module 340.

Figure 10:
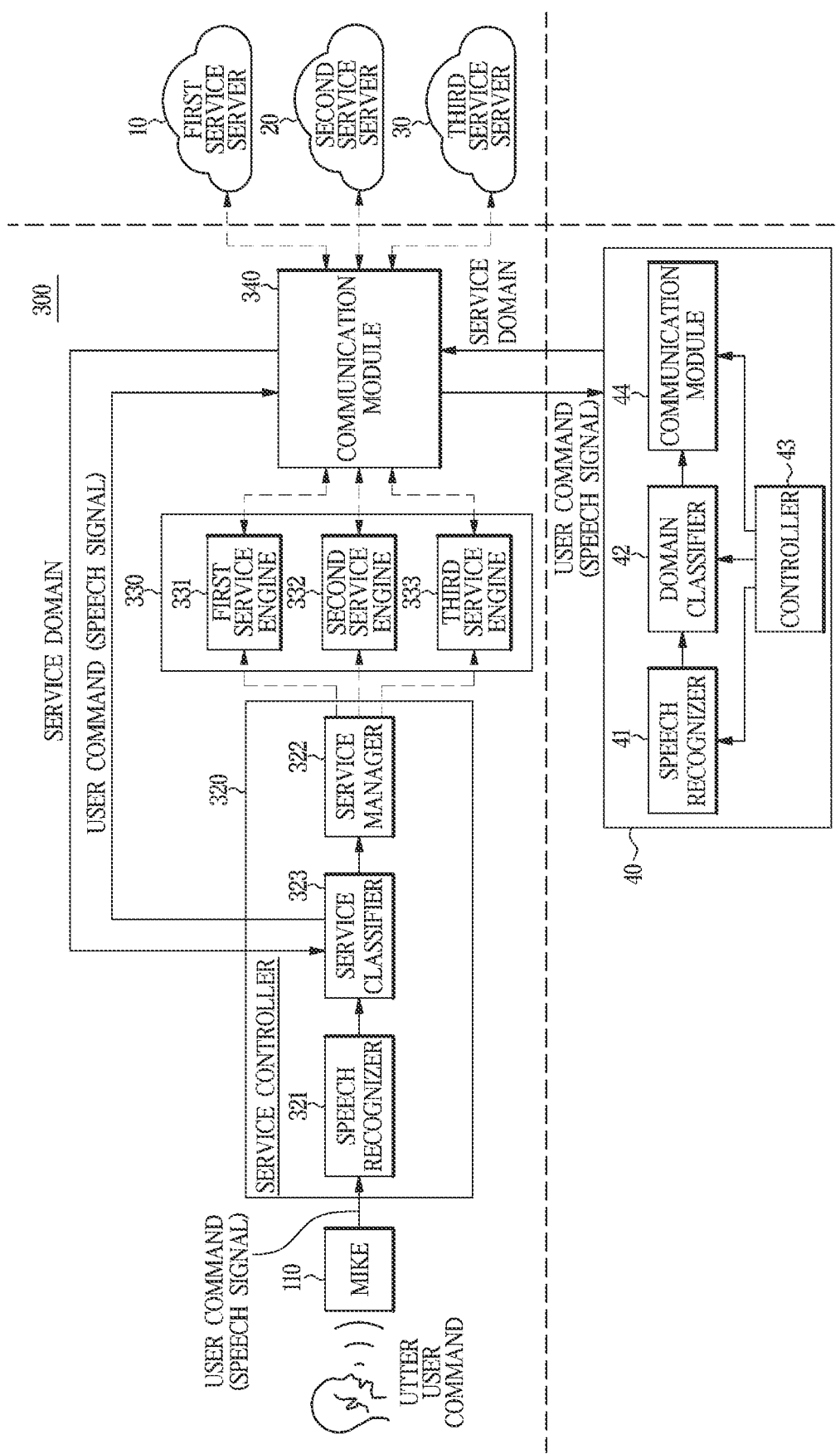
FIG. 10 is a detailed control block diagram of an electronic device, according to another embodiment.

FIG. 10 is a detailed control block diagram of an electronic device, according to another embodiment.

Referring to FIG. 10, the service controller 320 may include a speech recognizer 321 for recognizing a user speech entered through the mike 310, a service classifier 323 for obtaining a service domain corresponding to a user command entered through the mike 310, and a service manager 322 for sending the user command entered through the mike 310 to at least one of the plurality of service engines 331, 332, and 333.

The speech recognizer 321 may include a speech recognition engine for recognizing a speech and output it as an utterance in the form of text. It is the same as the speech recognizer 121 of the electronic apparatus 100 according to the previous embodiment, so the detailed description thereof will be omitted.

The speech recognizer 321 may recognize a wakeup word to activate a speech recognition mode of the electronic apparatus 300. Herein, activating a speech recognition mode of the electronic apparatus 300 may refer to or include having a user speech entered to the mike 310 be subject to recognition.

However, other trigger signals may be used to activate the speech recognition mode of the electronic apparatus 300. For example, the user may enter a trigger signal to activate a speech recognition mode by manually manipulating an input device such as a button, a touch screen, etc., equipped in the electronic apparatus 300.

The service classifier 323 may transmit the user command entered to the mike 310 to the domain classification server 40 in the form of a speech signal through the communication module 310. The whole user utterance may be transmitted, or when the wakeup word to the electronic apparatus 300 is contained, only a user command without a wakeup word for the electronic apparatus 300 may be transmitted.

In this embodiment, using the separate domain classification server 40 for performing speech recognition and NLU to extract a service domain from a user utterance, may help reduce the burden of capacity and performance of the electronic apparatus 300.

The domain classification server 40 may include a speech recognizer 41, a domain classifier 42, a communication module 44, and a controller 43.

The communication module 44 of the domain classification server 40 receives the user command transmitted from the electronic apparatus 300, and the speech recognizer 41 performs speech recognition on the received user command to convert it into a text form.

The domain classifier 42 may classify a service domain indicated by the user command as one of the plurality of service domains. Specifically, the domain classifier 42 may determine a service domain corresponding to the user command by performing NLU on the user command in the text form. The service domain may refer to a name representing a function that may be provided or handled by the speech recognition service. For example, service domains that may be classified by the domain classifier 42 may include at least one of various service domains such as weather, time, contacts, messages, schedules, recipes, alarm, home appliance control, light control, navigation, music, taxi call, broadcasting, movies, etc.

For example, service domain [weather] may represent a function for providing weather information in the speech recognition service, service domain [recipe] may represent a function for providing recipe information requested by the user in the speech recognition service, and service domain

[music] may represent a function for providing an audio file requested by the user in the speech recognition service.

The aforementioned service domains and corresponding functions are, however, only an example that may be applied to the electronic apparatus 300. Differently named service domains may be provided for the same function or the same function may be classified into other service domain than the above example.

As described above, the domain classifier 42 may perform NLU to determine a service domain based on the user command The domain classifier 42 may not, however, perform the whole procedure of general NLU comprised of processes such as morpheme analysis, syntax analysis, object name analysis, speech act analysis, speech intention analysis, semantic analysis, etc., but may perform NLU simplified by omitting some of the processes to determine a service domain. Performing the simplified NLU may lead to reducing time required to determine a service domain and improving response speed of the electronic apparatus 300 to an utterance of the user. It may also reduce the burden of capacity and performance of the domain classification server 40.

For example, the domain classifier 42 may determine a service domain corresponding to the user command by text matching. The domain classifier 42 may store at least one text corresponding to each service domain, and determine a service domain corresponding to a user command transmitted from the electronic apparatus 300 by comparing the user command with the stored text to determine whether they are matched with each other.

FIG. 11 illustrates a table representing examples of text for each service domain stored in a domain classification server.

When a speech recognition service is used, commands uttered by the user usually have a particular pattern for each service domain. Accordingly, the domain classifier 42 may build up a database of sentences following a particular pattern for each service domain and store the database in advance, and determine a service domain corresponding to a user command transmitted from the electronic apparatus 300 by comparing the user command with the pre-stored sentences.

As shown in FIG. 11, the domain classifier 42 may store a text matching table in which at least one corresponding text is matched with each service domain. For example, service domain [weather] may store text such as "how is the weather?", "give me weather information", "is the weather good?", "is it cold today?", "what degree is it today?", and the like, and service domain [recipe] may store text such as "give me the recipe", "give me how to cook", "how to cook?", and the like. Service domain [light control] may store text such as "turn on the light", "turn off the light", "light on", "light off", and the like. Service domain [message] may store "send the message", "transmit the message", "send the text", "transmit the text" and the like. In this way, the remaining service domains may store text according to a pattern for each service domain.

When the speech recognizer 41 converts a user command transmitted from the electronic apparatus 300 into text and transmits the text to the domain classifier 42, the domain classifier 42 may compare the transmitted text of user command with text in the text matching table.

The domain classifier 42 may determine whether the text of user command is matched with the text in the text matching table or whether the transmitted text of user command includes text in the text matching table.

In the case of determining whether it has a match, when the transmitted text of user command is matched with at least one piece of text in the text matching table, a service domain matched with the matched text may be determined as a service domain corresponding to the transmitted user command.

In the case of determining whether the transmitted text of user command includes text in the text matching table, when the transmitted text of user command includes at least one piece of text in the text matching table, a service domain matched with the text included may be determined as a service domain corresponding to the transmitted user command For example, when the transmitted text of user command is "how is the weather today?", it contains "how is the weather?" matched with the service domain [weather], so the domain classifier 42 may determine the [weather] as a service domain corresponding to the transmitted user command In another example, the domain classifier 42 may determine a service domain corresponding to the user command by keyword matching. The domain classifier 42 may build up a database of at least one keyword for each service domain and store the database, and determine a service domain corresponding to a user command transmitted from the electronic apparatus 300 by comparing the user command with the stored keywords.

FIG. 12 illustrates a table representing an example of keywords for each service domain stored in a domain classification server.

As described above, when a speech recognition service is used, commands uttered by the user have a particular pattern for each service domain. Specifically, a command uttered by the user may have a sentence structure including a keyword according to a particular pattern for each service domain. Accordingly, the domain classifier 42 may build up a database of keywords following a particular pattern for each service domain and store the database in advance, and determine a service domain corresponding to a user command transmitted from the electronic apparatus 300 by determining whether the transmitted user command includes a pre-stored keyword.

As shown in FIG. 12, the domain classifier 42 may store a keyword matching table in which at least one corresponding keyword is matched with each service domain. The service domain [weather] may store keywords related to times and keywords related to weather. For example, the keywords related to times may include words indicating dates such as "today", "tomorrow", "the day after tomorrow", "this week", "next week", etc., or combinations of words and numbers indicating dates such as "xx (day), xx (month)". The keywords related to weather may include words representing weather, such as "weather", "wind", "rain", "temperature", "temperature", and the like. Alternatively, it may include words or morphemes having meanings such as cold/hot/fresh/chill, etc., for a specific expression to directly indicate a temperature.

The service domain [recipe] may store keywords related to dish names and keywords related to recipes. Keywords related to dish names may include words indicating dish names such as "pasta", "kimchi stew", "pizza", "galbijjim", etc. The keywords indicating recipes may include words that may represent recipes, such as "recipe", "how to cook", "cooking method", etc., or morphemes that have the same or similar meaning to the corresponding word.

Furthermore, the service domain [light control] may store keywords related to lights and keywords related to control. The keywords related to lights may include words indicating "lamp", "light", and the like. The keywords related to control may include morphemes having a meaning indicating a specific light control method such as turn on/turn off/light on/dim a light, etc.

Furthermore, the service domain [message] may store keywords representing a message and keywords representing transmission. The keywords indicating a message may include words representing messages such as "message", "text", "reply", "kakao talk", "line", "whatsapp", etc., or names of particular applications for sending messages. The keywords indicating transmission may include morphemes having meanings related to transmission, such as send/transmit, etc.

In this way, the remaining service domains may store keywords according to a pattern for each service domain.

When the speech recognizer 41 converts a user command transmitted from the electronic apparatus 300 into text and transmits the text to the domain classifier 42, the domain classifier 42 may compare the transmitted text of user command with keywords in the keyword matching table.

The domain classifier 42 may determine whether the user command includes a keyword stored in the keyword matching table. For example, when the user command includes at least one of the keywords related to times and at least one of the keywords related to weather stored in the keyword matching table, the domain classifier 42 may determine [weather] as a service domain corresponding to the user command Alternatively, even when it only includes a keyword related to weather, [weather] may be determined as a service domain corresponding to the user command In the meantime, the domain classifier 42 may improve accuracy in extraction of a service domain by additionally determining a speech act of the user command in addition to the aforementioned keyword matching. For example, speech acts such as requests and questions may be matched and stored for each service domain based on the nature of the service domain, and whether the speech act of the user command is matched with a stored speech act may further be determined.

For example, when the service domain corresponding to the user command is determined to be [recipe] as a result of keyword matching, the domain classifier 42 may further determine whether the speech act of the user command is a request or a question, and determine [recipe] as a service domain corresponding to the user command when the speech act of the user command corresponds to the request or the question.

In the meantime, a user command sometimes includes keywords matched with two or more service domains. The domain classifier 42 may set priorities between service domains in advance, and when a user command transmitted from the electronic apparatus 300 includes keywords matched with two or more service domains, it may determine a service domain corresponding to the user command based on the priorities between the corresponding service domains.

For example, when a user command corresponds to "send a message for my sister to give me how to cook pasta", the user command includes a keyword matched to the service domain [recipe] as well as a keyword matched to the service domain [message]. The service domain [message] may be set to have a higher priority over the service domain [recipe], i.e., the service domain [message] may have priority 1 and the service domain [recipe] may have priority 2. In this case, the domain classifier 42 may determine [message] as a service domain corresponding to the user command Priority of a service domain may vary depending on a relation with the other service domain for comparison. For example, although the priority of the service domain [message] is set to 1 with respect to the service domain [recipe], it may be set to 2 with respect to the service domain [broadcasting]. In this way, the domain classifier 42 may set a priority of each service domain with respect to the other service domain for comparison, thereby reducing a probability of an error occurring in determining a service domain.

To determine a service domain in the method of text matching or keyword matching, the domain classifier 42 may perform even syllable division of the NLU, perform morpheme analysis, perform morpheme analysis and even object name recognition, or perform morpheme analysis and speech act analysis, or morpheme analysis, object name recognition and even speech act analysis. A degree to which the domain classifier 42 simplifies the process of NLU may be determined based on how to determine a service domain, a processing rate of a processor, a memory capacity, etc.

In the meantime, the domain classification server 40 may receive a feedback from the user about a result of determining a service domain, and improve accuracy and reliability in determining a service domain by updating the text matching table or the keyword matching table based on the feedback of the user. Furthermore, in updating the text matching table or the keyword matching table, machine learning may be applied to improve reliability of the databases.

Once the domain classification server 42 determines a service domain corresponding to a user command, the communication module 44 may transmit the determined service domain to the electronic apparatus 300.

The controller 43 may control general operation of the domain classification server 40. Alternatively, the controller 43 may be omitted depending on the design, and the speech recognizer 41, the domain classifier 42, and the communication module 44 may each perform control operations required.

The speech recognizer 41, the domain classifier 42, and the controller 43 may be implemented with at least one memory for storing a program to perform the aforementioned operations and associated data, e.g., the text matching table or the keyword matching table, and at least one processor for carrying out the stored program. The speech recognizer 41, the domain classifier 42, and the controller 43 may be implemented with respective memories and processors, or may share memories and processors with each other.

The communication module 340 may receive the service domain transmitted from the domain classification server 40, and the service classifier 323 may determine a speech recognition service corresponding to the received service domain.

FIG. 13 illustrates a table in which each speech recognition service matches a corresponding service domain.

The service domain that may be provided or handled may be changed for each speech recognition service. Hence, as shown in FIG. 13, the service classifier 323 may store a domain matching table having a match of service domain that may be provided or handled for each speech recognition service type.

For example, the first service may be matched with service domains such as weather, times, alarm, schedules, etc., the second service may be matched with service domains such as contacts, messages, navigation, taxi call, etc., and the third service may be matched with service domains such as recipes, music, broadcasting, movies, home appliance control, light control, etc.

The service classifier 323 may search the stored domain matching table for a speech recognition service matched with the service domain transmitted from the domain classification server 40, and determine the discovered speech recognition service as a speech recognition service corresponding to the user command For example, when the service domain transmitted from the domain classification server 40 is [message], the service classifier 33 may determine the second service to be the speech recognition service corresponding to the user command In the meantime, overlapping service domains may be provided or handled between the speech recognition services. In this case, a speech recognition service more optimized for handling the overlapping service domain may be matched with the service domain. Information about what speech recognition service is optimized for handling what service domain may be obtained by experiments, statistics, etc., or by a user feedback. Obtaining it by a user feedback may increase satisfaction of the user by providing a speech recognition service that reflects preferences of the user.

When the service classifier 323 determines a speech recognition service corresponding to the user command, the service manager 322 may send a user command to a service engine corresponding to the determined speech recognition service, and the service engine may transmit the user command to a service server for providing the determined speech recognition service, through the communication module 340.

Operations performed after the user command is transmitted to a service server are the same as what are described in the previous embodiments.

Alternatively, a table in which service domains are matched with the respective speech recognition services may be stored in the domain classification server 40. In this case, the domain classification server 40 may determine not only a service domain corresponding to the user command but also a speech recognition service, and transmit the results to the electronic apparatus 300. The service controller 320 may perform a process to transmit a user command to the speech recognition service determined by the domain classification server 40.

Figure 14:
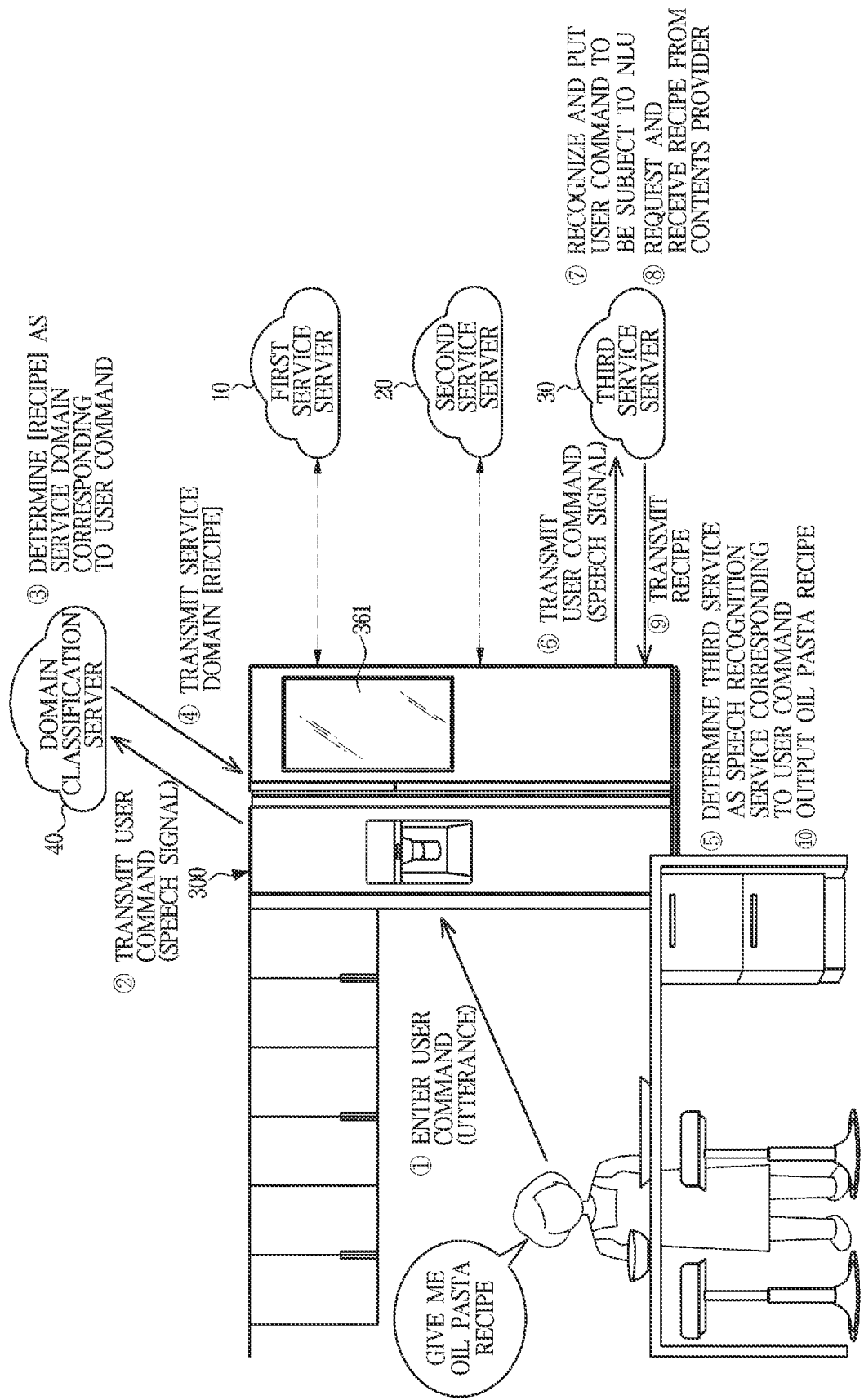
FIGS. 14 and 15 schematically illustrate signal flows when an electronic apparatus according to another embodiment is a refrigerator.
Figure 15:
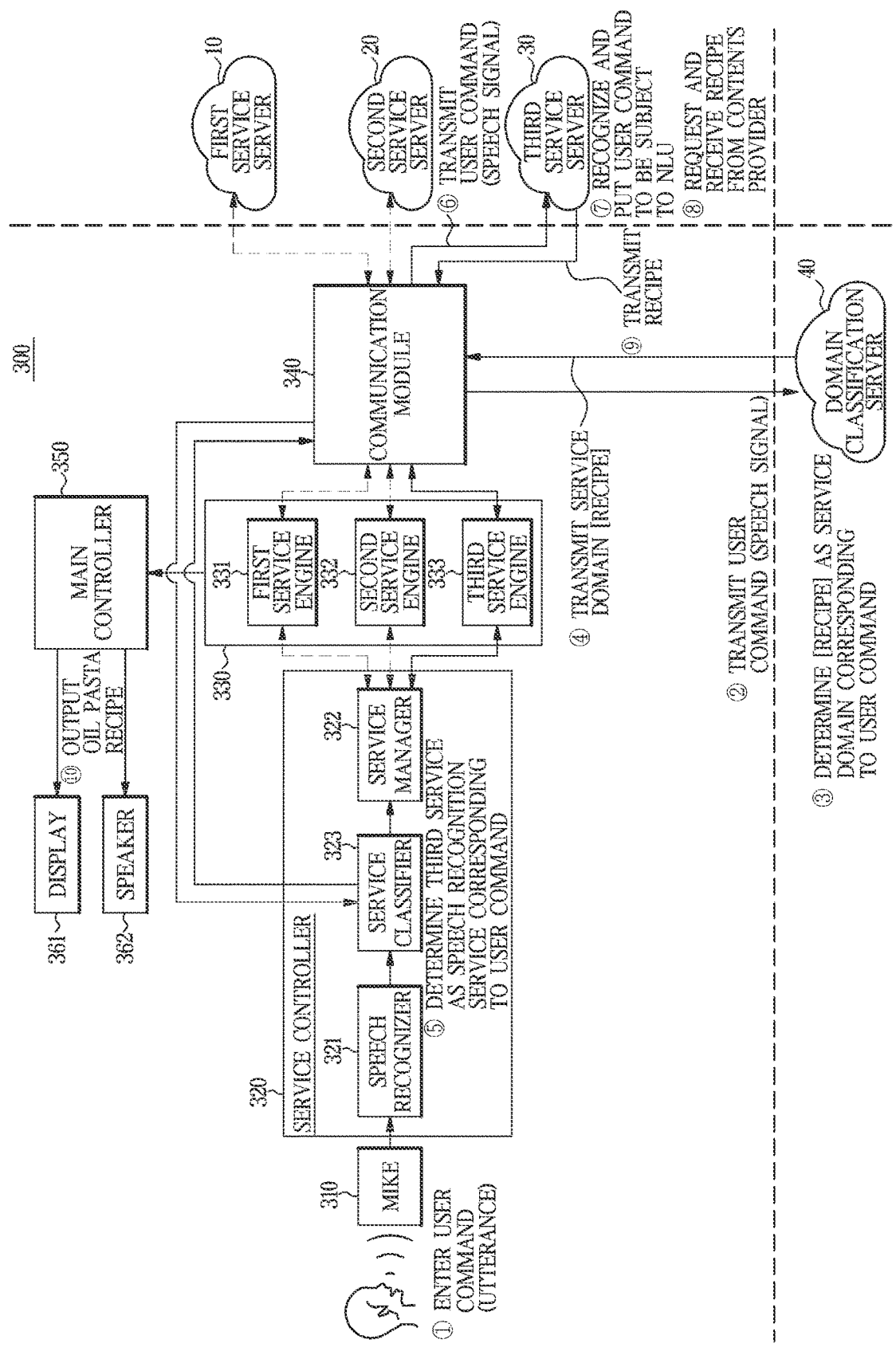

FIGS. 14 and 15 schematically illustrate signal flows when an electronic apparatus according to another embodiment is a refrigerator.

As illustrated in FIGS. 14 and 15, when the user utters a user command "give me an oil pasta recipe" near a refrigerator to use a speech recognition service, ① the uttered user command is entered to the mike 310, and the mike 310 converts the entered user command "give me an oil pasta recipe" into a speech signal and sends the speech signal to the service controller 320.

On an occasion when the user also utters a wakeup word to activate a speech recognition mode of an electronic apparatus 300, the speech recognizer 321 may recognize the wakeup word and activate a speech recognition mode of the electronic apparatus 300.

② the service classifier 323 may transmit the user command "give me an oil pasta recipe" to the domain classification server 40 through the communication module 340 in the form of a speech signal. The communication module 44 of the domain classification server 40 receives the transmitted user command, and the speech recognizer 41 performs speech recognition on the received user command to convert it into a text form.

The domain classifier 42 may determine a service domain corresponding to the user command by performing simplified NLU on the user command "give me an oil pasta recipe" in the text form.

When the domain classifier 42 determines a service domain by text matching, and the aforementioned text matching table of FIG. 11 is stored, ③ the service domain [recipe] may be determined as a service domain corresponding to the user command because the user command contains text matched with the service domain [recipe].

④ the communication module 44 transmits the determined service domain [recipe] to the electronic apparatus 300 and the communication module 340 receives the service domain [recipe].

The service classifier 323 may determine a speech recognition service corresponding to the service domain [recipe], i.e., a speech recognition service corresponding to the user command, based on the table in which each service domain is matched with a corresponding speech recognition service. Referring to the aforementioned example of FIG. 13, ⑤ the service classifier 323 may determine the third service matched with the service domain [recipe] as a speech recognition service corresponding to the user command In other words, the third service may be selected as a speech recognition service for providing a function requested by the user.

The service manager 322 transmits the user command "give me an oil pasta recipe" to the third service engine 333, and the third service engine 333 ⑥ transmits the user command "give me an oil pasta recipe" to the third service server 30 through the communication module 340.

⑦ the third service server 30 may grasp a request indicated by the user command by performing speech recognition and NLU, ⑧ request and receive a recipe of oil pasta from a contents provider, and ⑨ transmit the recipe to the electronic apparatus 300. When the recipe information is stored in the third service server 30, the third service server 30 may directly search for the recipe of oil pasta without requesting from the separate contents provider and transmit the recipe directly to the electronic apparatus 300.

When the communication module 340 receives the recipe of oil pasta, ⑩ the main controller 350 may output the received recipe of oil pasta through the display 361 or the speaker 362.

In the meantime, the domain classification server 40 may sometimes fail to determine a service domain. An example of an occasion when determination of a service domain is failed will now be described.

Figure 16:
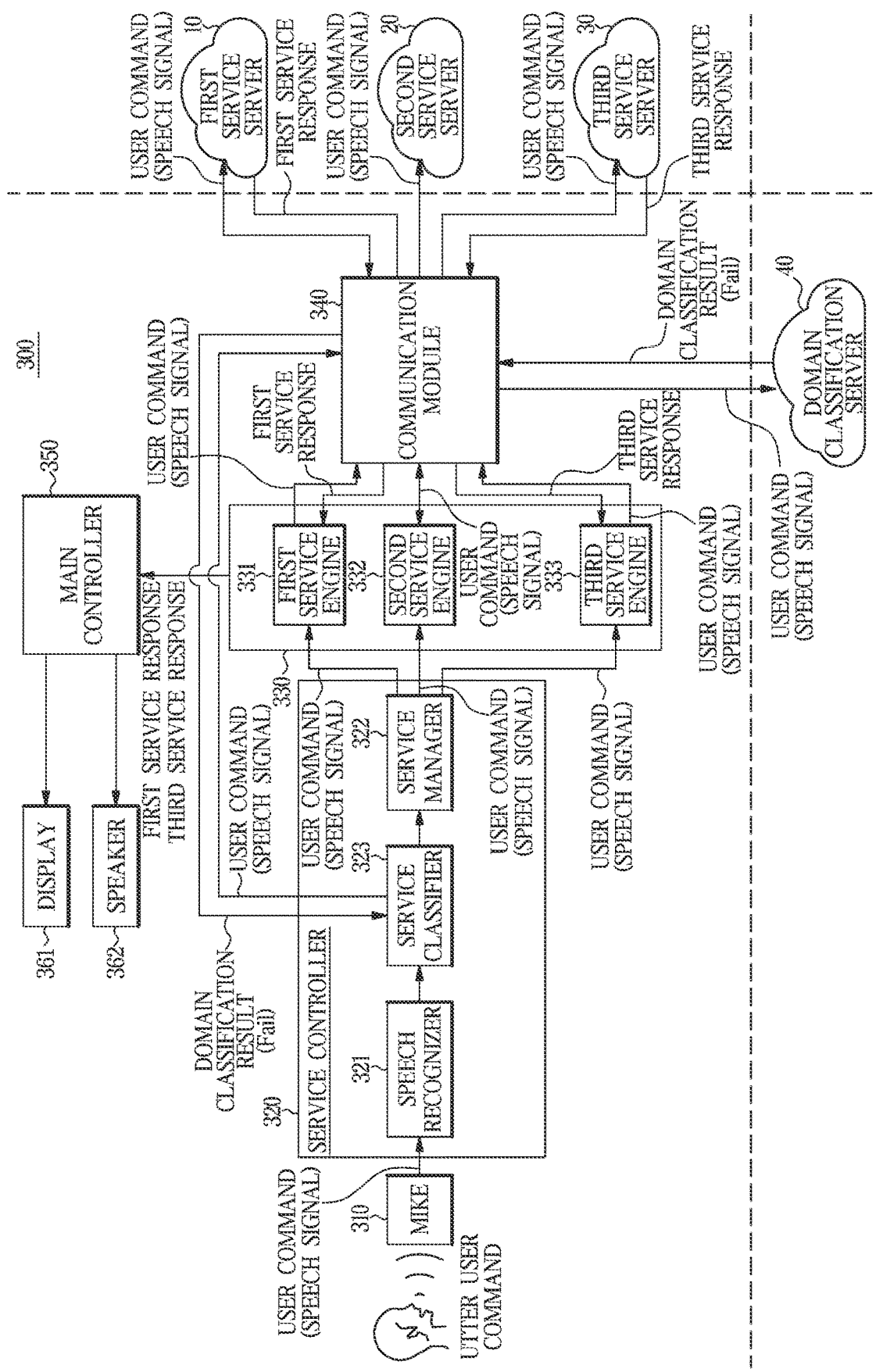
FIG. 16 schematically illustrates signal flows when a domain classification server fails to determine a service domain.
Figure 17:
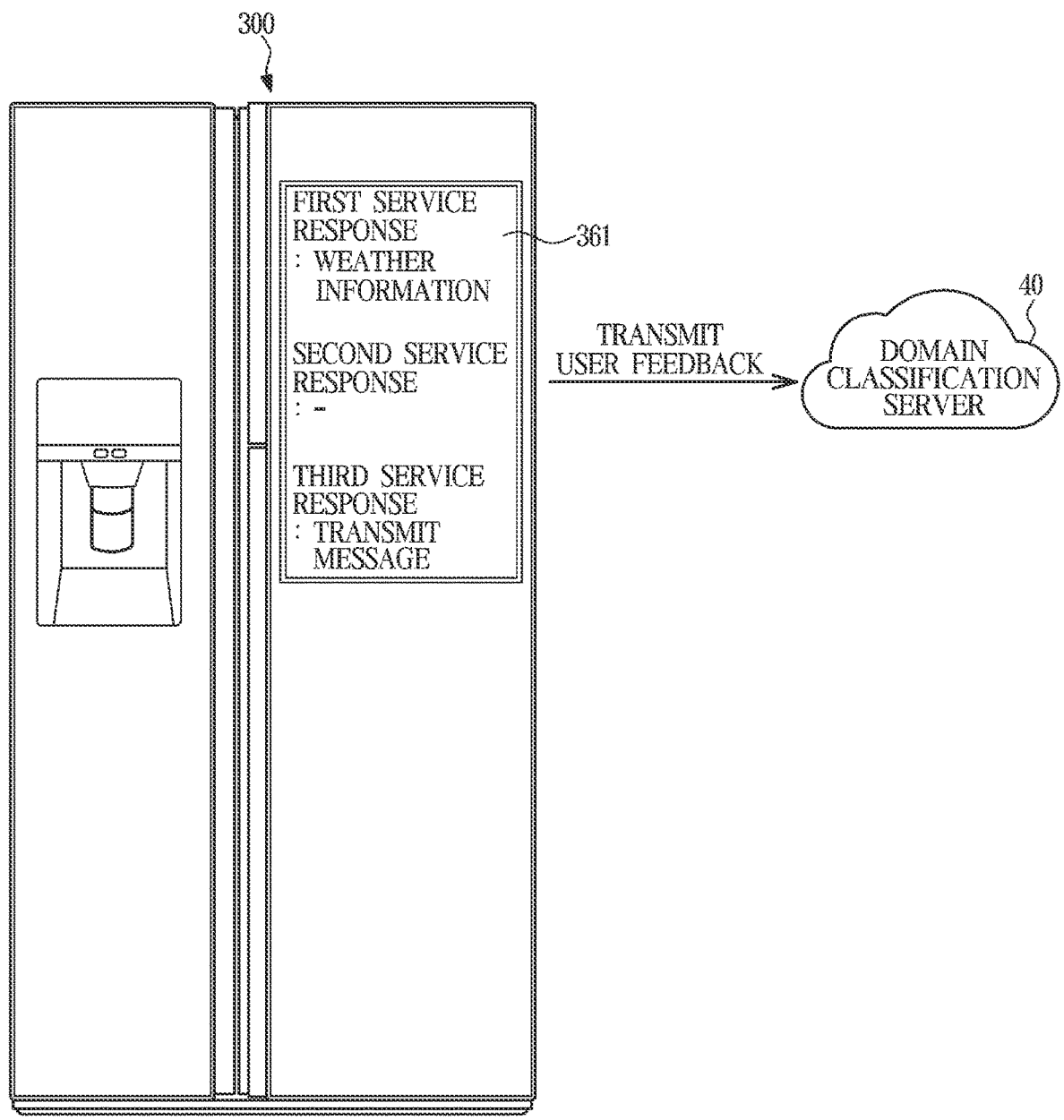
FIG. 17 illustrates a screen displayed on an electronic apparatus when a domain classification server fails to determine a service domain.

FIG. 16 schematically illustrates signal flows when a domain classification server fails to determine a service domain, and FIG. 17 illustrates a screen displayed on an electronic apparatus when a domain classification server fails to determine a service domain.

Referring to an example of FIG. 16, when the domain classification server 40 fails to determine a service domain corresponding to a user command (a domain determination result : fail), the electronic apparatus 300 may transmit the user command to all the service servers 10, 20, and 30 to receive service responses to the user command When each service server determines that it is not possible to handle the user command, the service server may not transmit a response or may transmit a response indicating handling impossibility to the electronic apparatus 300.

As in the examples of FIGS. 16 and 17, the first service server 10 may determine a service domain corresponding to the user command to be [weather] and transmit weather information as a first service response, and the third service server 30 may determine a domain corresponding to the user command to be [message] and transmit information relating to transmission of a message as a third service response.

The display 361 may output both the first service response and the third service response, and the user may enter a feedback about the output service responses. For example, the user may select a service response that he/she intends from among the output first service response and third service response. Selection of the service response may be made by speech, or may be made by manipulation with the input device.

When the user enters a feedback about the output service response, the service controller 320 may transmit the feedback of the user to the domain classification server 40. The feedback of the user may include the service response selected by the user or his/her service domain. The domain classifier 42 may update a database used to determine a service domain based on the feedback of the user. For example, the text matching table or the keyword matching table may be updated.

Furthermore, as feedbacks of the user are accumulated, machine learning may be applied to update the text matching table or the keyword matching table.

In the meantime, in another example, the electronic apparatus 300 may determine a service domain corresponding to the user command in the service classifier 323 without having the domain classification server 40 separately. In this case, the aforementioned operations of the domain classifier 42 may be performed by the service classifier 323.

In yet another example, one of a plurality of servers for providing speech recognition services may be used as the domain classification server without having the domain classification server 40 separately. A related example will now be described with reference to FIG. 18.

Figure 18:
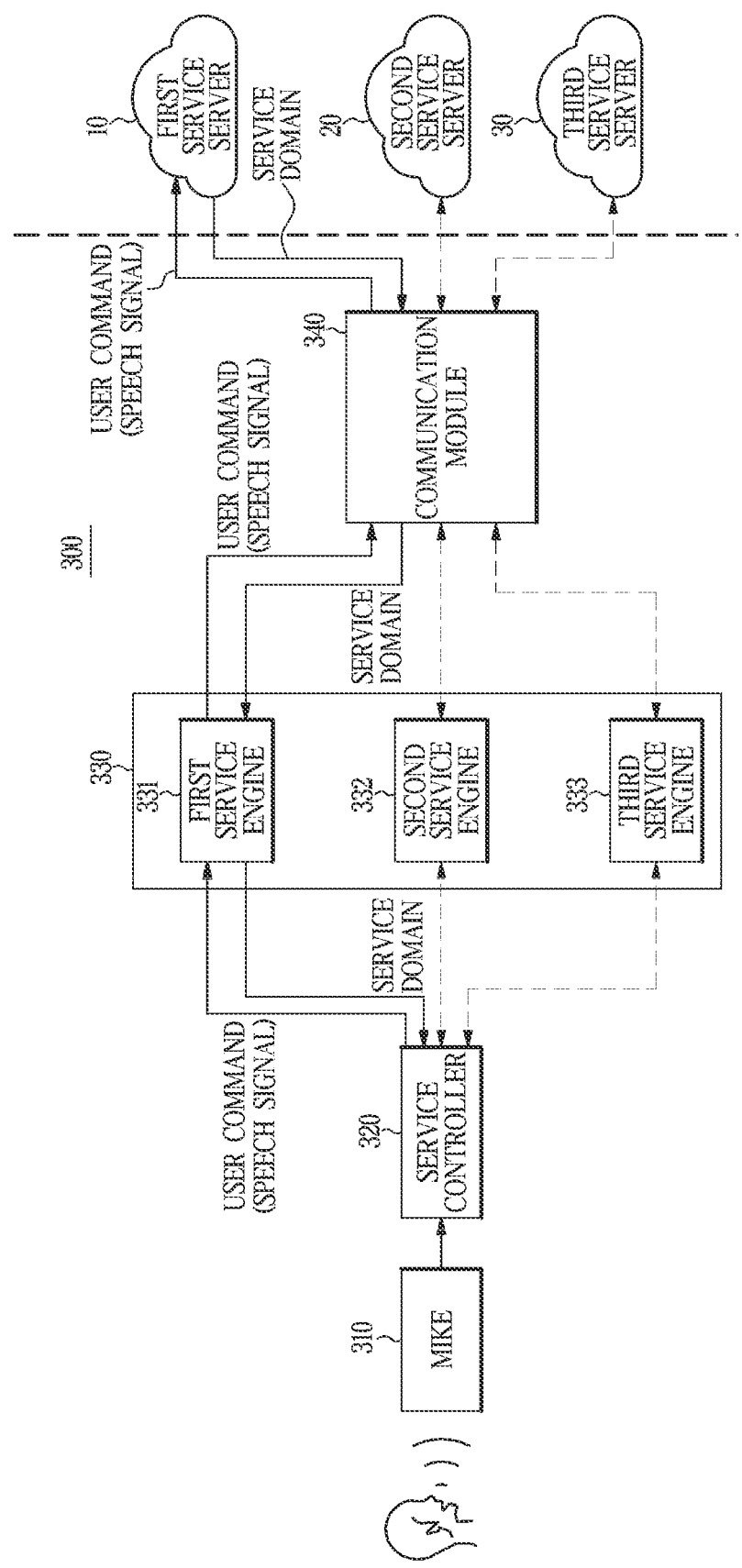
FIG. 18 is a control block diagram of an electronic apparatus according to another embodiment, when a service domain is classified by one of service servers.

FIG. 18 is a control block diagram of an electronic apparatus according to another embodiment, when a service domain is classified by one of service servers.

As shown in the example of FIG. 18, when the first service server 10 is designated as a server for classifying a service domain, the service classifier 323 may transmit a user command entered to the mike 310 to the first service server 10 through the first service engine 331 and the communication module 340.

The first server 10 determines a service domain corresponding to the transmitted user command The first service server 10 may determine a service domain with the same operations as in the aforementioned domain classification server 40, or determine a service domain by general NLU performed for service response creation.

When the first server 10 determines a service domain corresponding to the user command and transmits the service domain to the electronic apparatus 300, the service classifier 323 may search the domain matching table for a speech recognition service matched with the transmitted service domain to determine a speech recognition service corresponding to the user command Operations after the speech recognition service corresponding to the user command is determined are the same as in the aforementioned embodiments.

In both the cases of performing service domain classification in the domain classification server 40 and in one of the plurality of service servers, the electronic apparatus 300 may receive a feedback from the user after outputting a service response. The feedback of the user may include whether the output service response corresponds to the service domain intended by the user. When it does not correspond to the service domain intended by the user, the feedback may also include information regarding a service domain intended by the user.

The domain classification server 40 or the service server for performing service domain classification may update the text matching table or the keyword matching table based on the feedback of the user.

Furthermore, in updating the text matching table or the keyword matching table, the domain classification server 40 or the service server for performing service domain classification may perform machine learning to improve accuracy in service domain classification.

Furthermore, the domain classification server 40 or the service server for performing service domain classification may perform machine learning when classifying a service domain. A learning database used for the machine learning may include a plurality of data sets, each set having a user command and service domain pair. A relationship between a user command and a service domain included in one set indicates that the service domain is indicated by the user command The learning database may be updated by the user feedback, so that a service domain classification result personalized by reflecting the user's speaking habit may be obtained. Furthermore, feedbacks may be shared between different users. In this case, reliability in learning results may be improved by increasing the number of data used for learning.

In another embodiment, a user command entered to the mike 310 may be transmitted to all of the plurality of service servers. In this case, similar to the aforementioned case that service domain determination is failed, the user may be allowed to select a desired service response after receiving service responses corresponding to the user command from the plurality of service servers.

An embodiment of a method for using a speech recognition service in an aspect will now be described. For the method for using a speech recognition service in the one aspect, at least one of the aforementioned electronic apparatus 100 or 300 and the domain classification server 40 may be used. Hence, the aforementioned description of the electronic apparatus 100 or 300 and the domain classification server 40 will also be applied to the method for using a speech recognition service even without specific mentioning.

Figure 19:
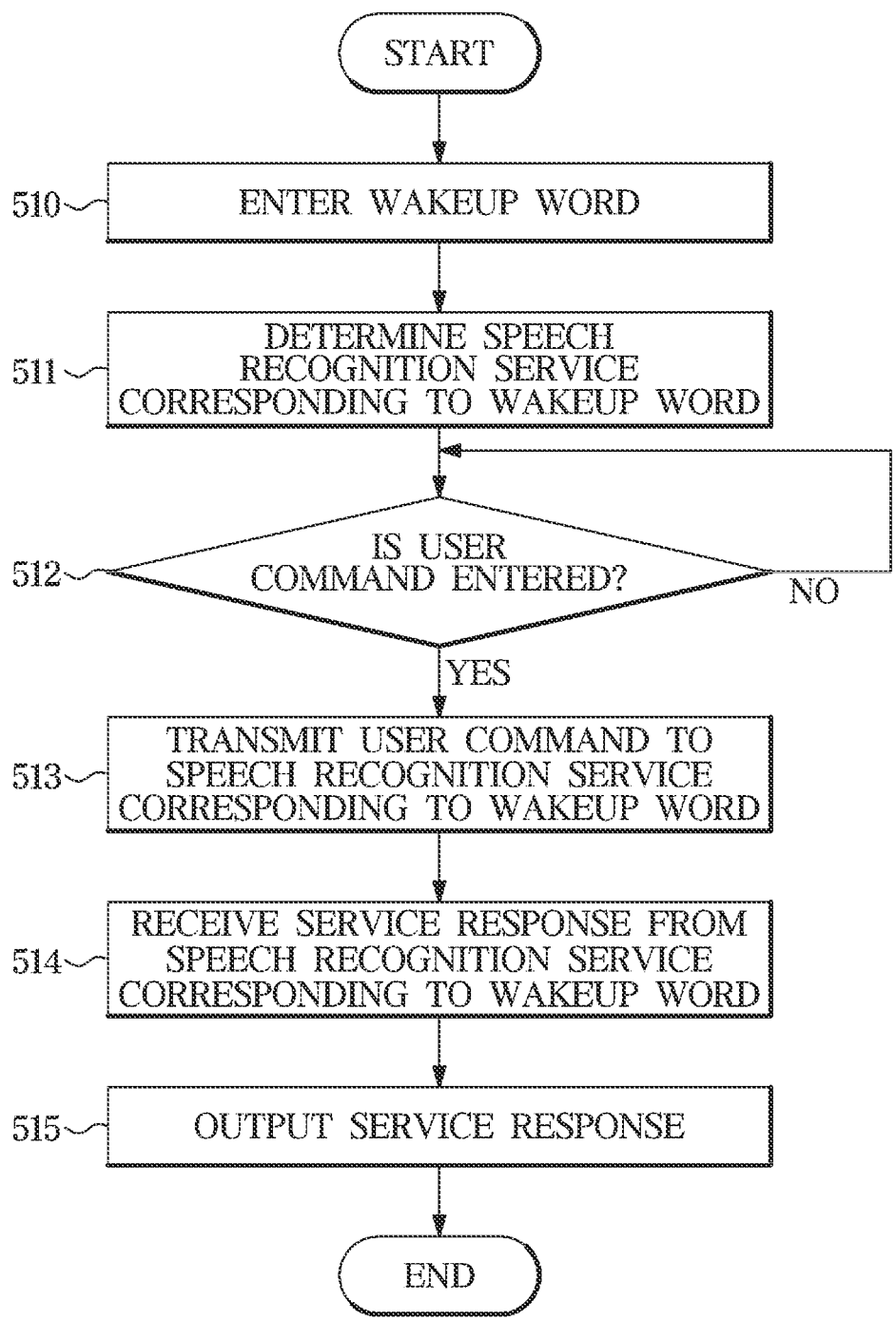
FIG. 19 is a flowchart of a method for using a speech recognition service, according to an embodiment.

FIG. 19 is a flowchart of a method for using a speech recognition service, according to an embodiment. In performing the method for using a speech recognition service in this embodiment, the aforementioned electronic apparatus 100 may be used. Accordingly, the user may select one of the plurality of speech recognition services available to the single electronic apparatus 100 by uttering a wakeup word for a speech recognition service that the user wants to use.

Referring to FIG. 19, when the user utters a wakeup word, the uttered wakeup word is entered to the mike 110 of the electronic apparatus 100, in 510. The wakeup word are the same as described above.

The service controller 120 determines a speech recognition service corresponding to the wakeup word, in 511. When the speech recognizer 121 of the service controller 120 recognizes the wakeup word entered to the mike 110 and outputs it in a text form, the service manager 122 may determine what the speech recognition service is that the user wants to use by comparing the wakeup word output from the speech recognizer 121 with the wakeup word table.

In the meantime, as described above for the example of FIG. 5, the service engine module 130 may be equipped with a speech recognizer that is able to recognize the wakeup word. The service controller 120 may send the wakeup word uttered by the user to all of the first service engine 131, the second service engine 132, and the third service engine 133, or may designate one of them as a service engine to recognize the wakeup word and send the wakeup word only to the designated service engine.

Once the speech recognition service corresponding to the wakeup word is determined, the service manager 122 may control the service engine module 130 to transmit a user command uttered after the wakeup word to a server that provides a service corresponding to the wakeup word.

Specifically, when the user command is entered through the mike 110 (yes in 512), the user command is transmitted to the speech recognition service corresponding to the wakeup word, in 513. Herein, transmitting the user command to the speech recognition service refers to transmitting it to a service server that provides the corresponding speech recognition service. To transmit the user command to the service server, the service manager 122 may send the user command to the service engine module 130 and the service engine module 130 may transmit the user command to the service server through the communication module 140. Herein, what sends the user command to the communication module 140 may be a service engine equipped to provide a speech recognition service corresponding to the wakeup word among the plurality of service engines 131, 132, and 133 included in the service engine module 130.

The service server that receives the user command from the electronic apparatus 100 determines what a request included in the transmitted user command is by performing speech recognition and NLU on the transmitted user command, and creates and transmits a service response corresponding to the request included in the user command to the electronic apparatus 100.

The electronic apparatus 100 receives the service response from the speech recognition service corresponding to the wakeup word in 514, and outputs the received service response in 515. The main controller 150 of the electronic apparatus 100 may provide a service matched with the request of the user by performing suitable control in accordance with the received service response. For example, when the service matched with the request of the user is outputting information or content, the service response may be output visually or audibly through the display 161 or the speaker 162.

According to the aforementioned embodiment of FIG. 19, the user only needs to utter a wakeup word for a speech recognition service that the user wants among a plurality of speech recognition services available to a single electronic apparatus, so the user may simply and conveniently select the speech recognition service he/she wants.

Figure 20:
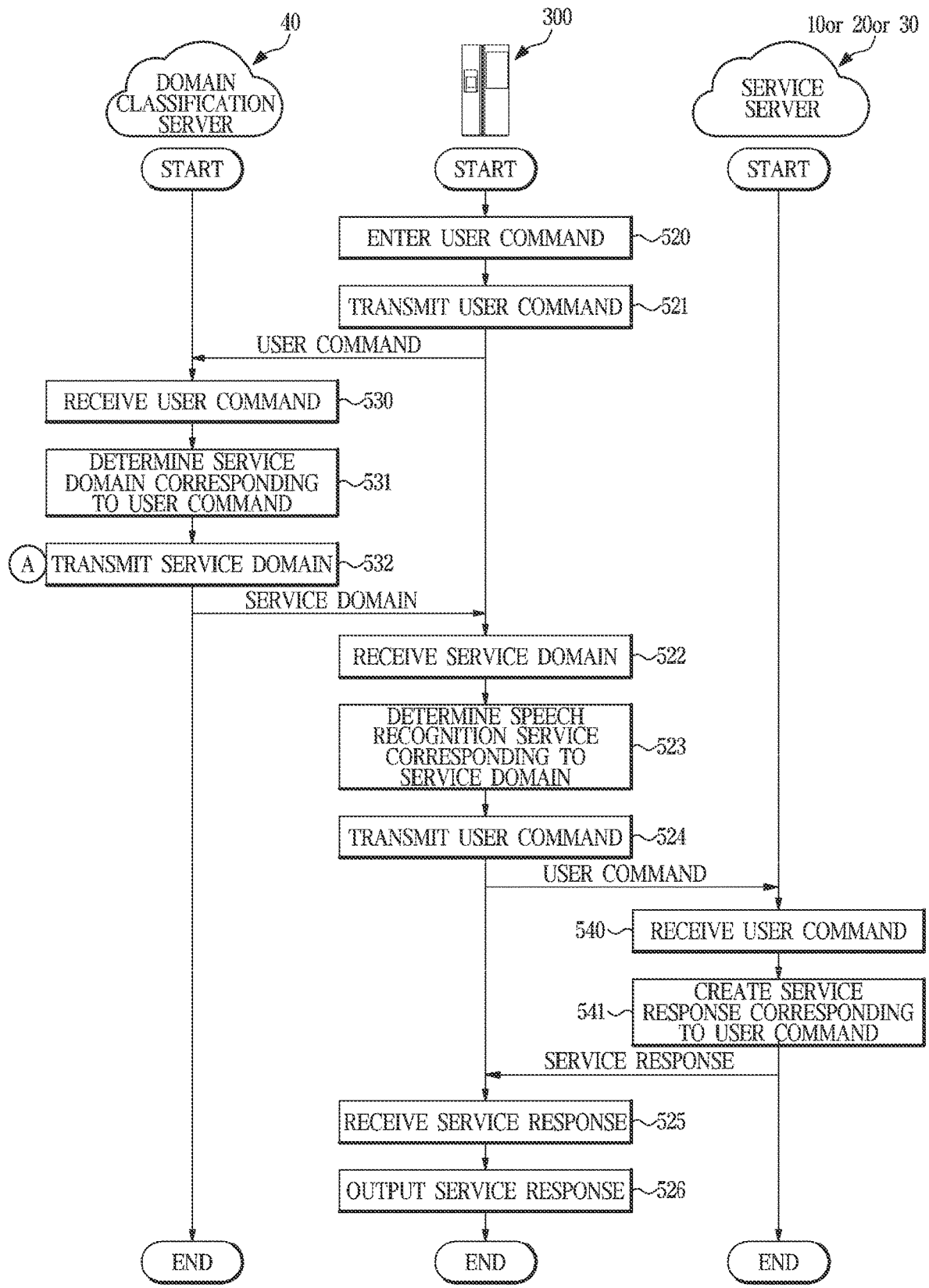
FIG. 20 is a flowchart of a method for using a speech recognition service, according to another embodiment.

FIG. 20 is a flowchart of a method for using a speech recognition service, according to another embodiment. In performing the method for using a speech recognition service in this embodiment, the aforementioned electronic apparatus 300 and the domain classification server 40 may be used. Accordingly, even when the user skips a wakeup word for selecting a speech recognition service and directly utters a user command, the user may select a desired speech recognition service from among speech recognition services available to the single electronic apparatus 300, Referring to FIG. 20, when the user utters a user command to request a desired service, the uttered user command is entered to the mike 310, in 520. The mike 310 converts the command uttered by the user into a speech signal and sends the speech signal to the service controller 320.

The service controller 320 transmits the user command in the speech signal form to the domain classification server 40 through the communication module 340, in 521.

The domain classification server 40 receives the user command in 530, and determines a service domain corresponding to the user command in 531. Specifically, the communication module 44 of the domain classification server 40 receives the user command transmitted from the electronic apparatus 300, and the speech recognizer 41 performs speech recognition on the received user command to convert it into a text form. The domain classifier 42 may determine a service domain corresponding to the user command by performing simplified NLU on the user command in the text form.

For example, the domain classifier 42 may determine a service domain corresponding to the user command by text matching or keyword matching. The text matching and keyword matching are the same as described above in the previous embodiments of the electronic apparatus 300.

The domain classification server 40 transmits the service domain determined to correspond to the user command to the electronic apparatus 300.

The electronic apparatus 300 receives the service domain from the domain classification server 40 in 522, and determines a speech recognition service corresponding to the service domain in 523. Specifically, the service domain that may be provided or handled may be changed for each speech recognition service. As illustrated above in FIG. 13, the service classifier 323 may store a domain matching table having a match of service domain that may be provided or handled for each speech recognition service type. The service classifier 323 may search the stored domain matching table for a speech recognition service matched with the service domain transmitted from the domain classification server 40, and determine the discovered speech recognition service as a speech recognition service corresponding to the user command Alternatively, a table in which service domains are matched with the respective speech recognition services may be stored in the domain classification server 40. In this case, the domain classification server 40 may determine not only a service domain corresponding to the user command but also a speech recognition service, and transmit the results to the electronic apparatus 300. The service controller 320 may perform a process to transmit a user command to the speech recognition service determined by the domain classification server 40.

A user command is transmitted to a service server that provides the determined speech recognition service, in 524. Specifically, the service manager 322 may send the user command to a service engine corresponding to the determined speech recognition service, and the service engine may transmit the user command to a service server for providing the determined speech recognition service, through the communication module 340.

The service server 10, 20 or 30 receives the user command from the electronic apparatus 300 in 540, and creates a service response corresponding to the user command in 541.

The created service response is transmitted to the electronic apparatus 300, in 525.

The electronic apparatus 300 receives the service response transmitted from the service server 10, 20 or 30 in 526, and outputs the received service response in 527.

The electronic apparatus 300 may receive a feedback from the user about the service response. The feedback of the user may include whether the output service response corresponds to the service domain intended by the user. When it does not correspond to the service domain intended by the user, the feedback may also include information regarding a service domain intended by the user. The domain classification server 40 may receive a feedback from the user from the electronic apparatus 300, and improve accuracy and reliability in determining a service domain by updating the text matching table or the keyword matching table based on the feedback of the user. Furthermore, in updating the text matching table or the keyword matching table, machine learning may be applied to improve reliability of the databases.

Figure 21:
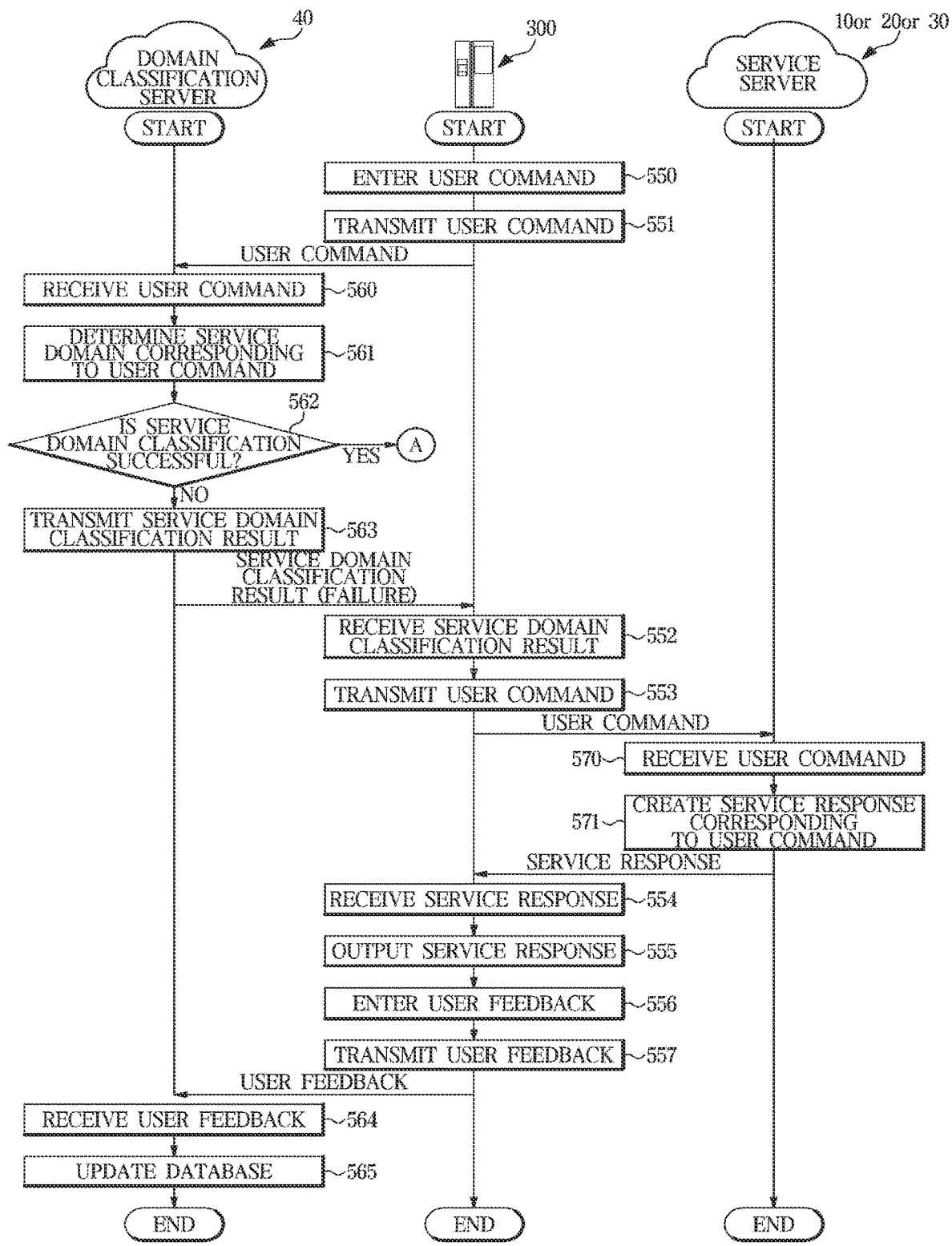
FIG. 21 is a flowchart of a method for using a speech recognition service when a domain classification server fails to determine a service domain, according to another embodiment.

FIG. 21 is a flowchart of a method for using a speech recognition service when a domain classification server fails to determine a service domain, according to another embodiment. What are described above in connection with FIGS. 16 and 17 may also be applied in this example.

Referring to FIG. 21, when the user utters a user command to request a desired service, the uttered user command is entered to the mike 310, in 550. The mike 310 converts the command uttered by the user into a speech signal and sends the speech signal to the service controller 320.

The service controller 320 transmits the user command in the speech signal form to the domain classification server 40 through the communication module 340, in 551.

The domain classification server 40 receives the user command in 560, and determines a service domain corresponding to the user command in 561.

When the domain classifier 42 fails to determine a service domain corresponding to the user command although having searched the text matching table or the keyword matching table for the user command to determine a service domain corresponding to the user command, it determines that classification of a service domain is failed (no in 562) and transmits the service domain classification result (failure) to the electronic apparatus 300.

The electronic apparatus 300 receives the service domain determination result in 552, and transmits the user command to the plurality of service servers 10, 20, and 30 in 553.

The plurality of service servers 10, 20 and 30 each receive the user command in 570 and create a service response corresponding to the user command in 571. Specifically, the plurality of service servers 10, 20 and 30 may perform speech recognition and NLU on the user command to determine a service domain corresponding to the user command, and create service responses corresponding to the corresponding service domains when it is determined that they are able to handle the service domains corresponding to the user command The service server that has created the service response transmits the service response to the electronic apparatus 300.

The electronic apparatus 300 receives the service responses from the plurality of service servers 10, 20 and 30 in 554, and outputs the received service response in 555. For example, the service response may be visually or audibly output the service response through the display 361 or the speaker 362.

The electronic apparatus 300 may receive a feedback from the user about the output service responses, in 556. For example, a service response intended by the user may be selected from among the output service responses, and the feedback of the user may include the selected service response or its service domain.

The electronic apparatus 300 transmits the user feedback to the domain classification server 40, in 557.

The domain classification server 40 may receive the user feedback in 564, and the domain classifier 42 may update a database based on the feedback of the user in 565. The database of the domain classifier 42 may include the text matching table or the keyword matching table. Furthermore, as feedbacks of the user are accumulated, machine learning may be applied to update the text matching table or the keyword matching table.

Figure 22:
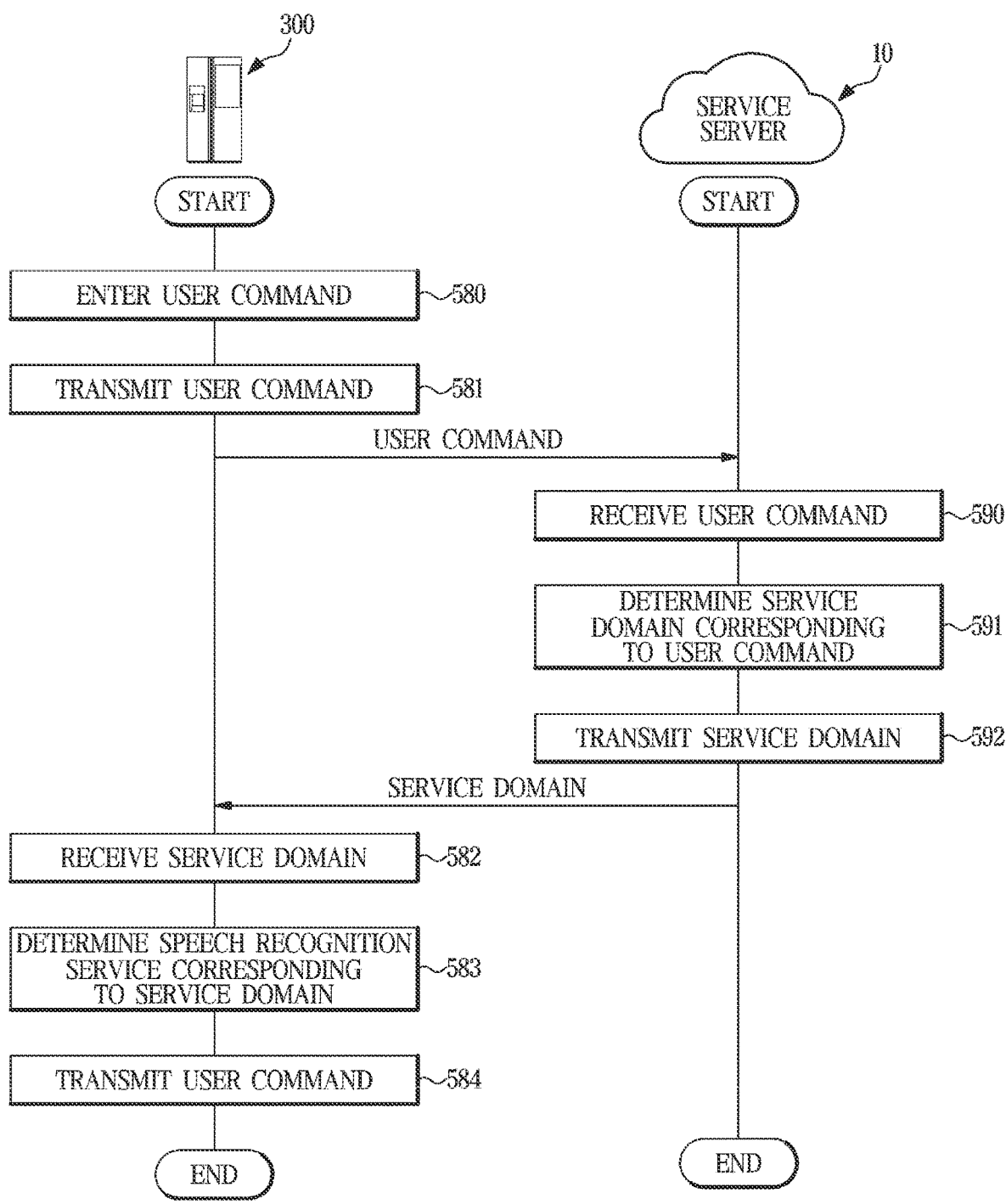
FIG. 22 is a flowchart of a method for using a speech recognition service when one of service servers classifies a service domain, according to another embodiment.

FIG. 22 is a flowchart of a method for using a speech recognition service when one of service servers classifies a service domain, according to another embodiment. According to this example, one of a plurality of servers for providing speech recognition services may be used as the domain classification server without having the domain classification server 40 separately. What are described above in connection with FIG. 18 may also be applied in this example.

Referring to FIG. 22, when the user utters a user command to request a service, the user command is entered to the mike 310, and the service controller 320 transmits the user command to the service server designated as the domain classification server through the communication module 340, in 581. In this example, assume that the first service server 10 is designated as the domain classification server.

The first service server 10 receives the user command in 590, and determines a service domain corresponding to the user command in 591. The first service server 10 may determine a service domain with the same operations as in the aforementioned domain classification server 40, or determine a service domain by general NLU performed for service response creation.

When a certain service domain is determined as a service domain corresponding to the user command, the first service server 10 transmits the determined service domain to the electronic apparatus 300, in 592.

The electronic apparatus 300 receives the service domain from the first service server 10 in 582, and determines a speech recognition service corresponding to the service domain in 583.

A user command is transmitted to a service server that provides the determined speech recognition service, in 584. Operations performed after the user command is transmitted to the service server are the same as what are described previously in connection with FIG. 19.

Alternatively, the electronic apparatus 300 may perform classification of the service domain. In this case, operations performed by the domain classification server 40 and the first service server 10 as described above in connection with FIGS. 21 and 22 may be performed in the electronic apparatus 300.

According to the electronic apparatus, the system including the same, and the method for using a speech recognition service as described above, in selecting one of a plurality of speech recognition services available to the single electronic apparatus, the user only needs to utter a wakeup word for a speech recognition service that the user wants to select. Alternatively, wakeup word utterance may be omitted, and a desired speech recognition service may be directly used even when the user directly utters a user command to request a desired function. This may enable the user to simply and conveniently use a plurality of speech recognition services of different types in a single electronic apparatus.

Furthermore, accuracy and reliability in service domain classification may be improved by updating a database used for the service domain classification using a user feedback about a service corresponding to a user command after the service is provided.

The above description illustrates the disclosure. Embodiments of the disclosure are described above, and the disclosure may be used in other various combinations and alterations of the embodiments, and environments. The disclosure may be changed or modified within a range equivalent to what is described above and/or a range of technologies or knowledge of ordinary skill in the art. The aforementioned embodiments of the disclosure are for explaining the best modes to practice the technical idea of the disclosure, and many different modifications thereto may be made for a specific application area and usage. Accordingly, the embodiments of the disclosure are not intended to limit the scope of the disclosure to what are disclosed above. The appended claims are to be interpreted as including other embodiments.

The invention claimed is:

1. An electronic apparatus comprising:
    a plurality of service engines corresponding to a plurality of speech recognition services, respectively;
    a communication circuit connected via wireless communication to a plurality of service servers for providing the plurality of speech recognition services, respectively;
    a mike configured to receive speech of a user including a user command uttered by a user; and
    a service controller configured to:
        when the received speech of the user includes the user command and a wakeup word, transmit an entirety of the received speech of the user or only the user command without the wakeup word to a domain classification server through the communication circuit,
        when the received speech of the user does not include the wakeup word, transmit an entirety of the received speech of the user to the domain classification server through the communication circuit,
        obtain a service domain result for a service domain corresponding to the received user command from the domain classification server through the communication circuit, the domain classification server performing machine learning to classify the service domain and providing the service domain result,
        in response to the service domain result indicating success in classifying, by the domain classification server, the service domain corresponding to the received user command from the domain classification server through the communication circuit,
        determine a speech recognition service from among the plurality of speech recognition services based on the obtained service domain, and
        transmit the received user command to a service engine corresponding to the determined speech recognition service among the plurality of service engines, and
        in response to the service domain result indicating failure in classifying, by the domain classification server, the service domain corresponding to the received user command from the domain classification server through the communication circuit, transmit the received user command to the plurality of service engines.

2. The electronic apparatus of claim 1, wherein the plurality of service engines are configured to run a plurality of applications, respectively, to use the plurality of speech recognition services.

3. The electronic apparatus of claim 1, wherein the service engine corresponding to the determined speech recognition service is configured to transmit the received user command to a service server which provides the determined speech recognition service among the plurality of service servers, through the communication circuit.

4. The electronic apparatus of claim 3, wherein the service engine corresponding to the determined speech recognition service is configured to receive a service response corresponding to the received user command from the service server which provides the determined speech recognition service among the plurality of service servers, through the communication circuit.

5. The electronic apparatus of claim 1, wherein the service controller is configured to recognize and convert a wakeup word received by the mike to text.

6. The electronic apparatus of claim 1, wherein at least one of the plurality of service engines is configured to recognize and convert a wakeup word received by the mike to text.

7. The electronic apparatus of claim 1, wherein the service controller is configured to:
    send the received user command to the plurality of service engines when the determining of the service domain corresponding to the received user command fails; and
    transmit, by the plurality of service engines, the received user command to a plurality of service servers which provide the plurality of speech recognition services, respectively.

8. The electronic apparatus of claim 7, wherein the service controller is configured to output a service response corresponding to the received user command when the service response is transmitted from at least one of the plurality of service servers.

9. The electronic apparatus of claim 8, wherein the service controller is configured to:
    receive a user feedback about an output service response; and
    transmit the user feedback to the domain classification server to update a database based on the user feedback.

10. A method for using a speech recognition service to use a plurality of speech recognition services in a single electronic apparatus, the method comprising:
    receiving speech including a user command uttered by a user through a mike equipped in the single electronic apparatus;
    when the received speech of the user includes the user command and a wakeup word, transmitting an entirety of the received speech of the user or only the user command without the wakeup word to a domain classification server through a communication circuit;
    when the received speech of the user does not include the wakeup word, transmitting an entirety of the received speech of the user to the domain classification server through the communication circuit;
    obtaining a service domain result for a service domain corresponding to the received user command from the domain classification server through the communication circuit, the domain classification server performing machine learning to classify the service domain and providing the service domain result;
    in response to the service domain result indicating success in classifying, by the domain classification server, the service domain corresponding to the received user command from the domain classification server through the communication circuit, determining a speech recognition service from among the plurality of speech recognition services based on the obtained service domain, transmitting the received user command to a service engine corresponding to the determined speech recognition service, among a plurality of service engines corresponding to the plurality of speech recognition services, respectively, and transmitting, by the service engine, the received user command to a service server which provides the determined speech recognition service; and in response to the service domain result indicating failure in classifying, by the domain classification server, the service domain corresponding to the received user command from the domain classification server through the communication circuit, transmitting the received user command to the plurality of service engines.

11. The method of claim 10, further comprising:
transmitting the received user command to the plurality of service engines when the determining of the service domain corresponding to the received user command fails; and transmitting, by the plurality of service engines, the received user command to a plurality of service servers which provide the plurality of speech recognition services, respectively.

12. The method of claim 11, further comprising:
outputting a service response corresponding to the received user command when the service response is transmitted from at least one of the plurality of service servers.

13. The method of claim 12, further comprising:
receiving a user feedback about an output service response; and updating a database used to determine the service domain, based on the user feedback.

14. A system comprising:
a plurality of service engines corresponding to a plurality of speech recognition services, respectively;

a communication circuit connected via wireless communication to a plurality of service servers for providing the plurality of speech recognition services, respectively;

a mike configured to receive speech of a user including a user command uttered by a user;

a service controller configured to:
when the received speech of the user includes the user command and a wakeup word, transmit an entirety of the received speech of the user or only the user command without the wakeup word to a domain classification server through the communication circuit, when the received speech of the user does not include the wakeup word, transmit an entirety of the received speech of the user to the domain classification server through the communication circuit, obtain a service domain result for a service domain corresponding to the received user command from the domain classification server through the communication circuit, the domain classification server performing machine learning to classify the service domain and providing the service domain result, in response to the service domain result indicating success in classifying, by the domain classification server, the service domain corresponding to the received user command from the domain classification server through the communication circuit, determine a speech recognition service from among the plurality of speech recognition services based on the obtained service domain, and transmit the received user command to a service engine corresponding to the determined speech recognition service among the plurality of service engines, and in response to the service domain result indicating failure in classifying, by the domain classification server, the service domain corresponding to the received user command from the domain classification server through the communication circuit, transmit the received user command to the plurality of service engines; and a domain classification server is configured to determine the service domain corresponding to the received user command.

15. The system of claim 14, wherein the domain classification server is configured to perform text matching or keyword matching on the received user command.

16. The system of claim 15, wherein the domain classification server is configured to:
store at least one text corresponding to each of a plurality of service domains in advance; and determine whether the at least one text stored in advance matches the received user command, to perform the text matching.

17. The system of claim 15, wherein the domain classification server is configured to:
store at least one keyword corresponding to each of a plurality of service domains in advance; and determine whether the received user command includes the at least one keyword stored in advance, to perform the keyword matching.

18. The system of claim 17, wherein the domain classification server is configured to:
set priorities between the plurality of service domains in advance; and determine a service domain corresponding to the received user command based on the priorities when the received user command includes keywords corresponding to two or more service domains.

19. The system of claim 15, wherein the domain classification server is configured to update a database used for the text matching or the keyword matching based on a user feedback about the determined service domain when the user feedback is entered.

* * * * *